US012581568B2

(12) United States Patent
Hao et al.

(10) Patent No.: US 12,581,568 B2
(45) Date of Patent: Mar. 17, 2026

(54) COMMUNICATION METHOD AND RELATED APPARATUS THEREOF

(71) Applicant: Huawei Technologies Co., Ltd., Shenzhen (CN)

(72) Inventors: Jinping Hao, Shanghai (CN); Yinghao Guo, Shanghai (CN); Yinghao Jin, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 286 days.

(21) Appl. No.: 18/304,555

(22) Filed: Apr. 21, 2023

(65) Prior Publication Data

US 2023/0262837 A1     Aug. 17, 2023

Related U.S. Application Data

(63) Continuation of application No. PCT/CN2020/123144, filed on Oct. 23, 2020.

(51) Int. Cl.
| | |
|---|---|
| *H04W 76/30* | (2018.01) |
| *H04L 5/00* | (2006.01) |
| *H04W 64/00* | (2009.01) |

(52) U.S. Cl.
CPC ........... *H04W 76/30* (2018.02); *H04L 5/0048* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2019/0394746 A1 | 12/2019 | Edge et al. | |
| 2020/0053686 A1 | 2/2020 | Edge et al. | |
| 2020/0229130 A1 | 7/2020 | Keating et al. | |
| 2022/0120842 A1* | 4/2022 | Edge ..................... | H04W 76/19 |

FOREIGN PATENT DOCUMENTS

| | | |
|---|---|---|
| CN | 107306448 A | 10/2017 |
| WO | 2020204961 A1 | 10/2020 |

OTHER PUBLICATIONS

"LTE Positioning Protocol (LPP)", 3GPP TS 37.355, Release 16, v16.0.0 (Year: 2020).*
Vivo, "Positioning in RRC idle and inactive state", 3GPP TSG-RANWG2, Meeting #112-E, R2-2009041, Nov. 2-13, 2023, 9 pages.
Qualcomm Incorporated, "Potential Positioning Enhancements for NR Rel-17 Positioning", 3GPP TSG RAN WG1 #103-e, e-Meeting, R1-2008619, Oct. 26-Nov. 13, 2020, 17 pages.

* cited by examiner

*Primary Examiner* — Walter J Divito
(74) *Attorney, Agent, or Firm* — Slater Matsil, LLP

(57) ABSTRACT
Embodiments of this application disclose a communication method and a related apparatus thereof, to implement positioning of a terminal device in a non-connected state. The method in embodiments of this application includes: A terminal device sends a radio resource control RRC resume request message to an access network device; and the terminal device receives an RRC release message from the access network device, where the RRC release message includes a long term evolution system positioning protocol LPP message, and the LPP message is from a positioning device.

20 Claims, 13 Drawing Sheets

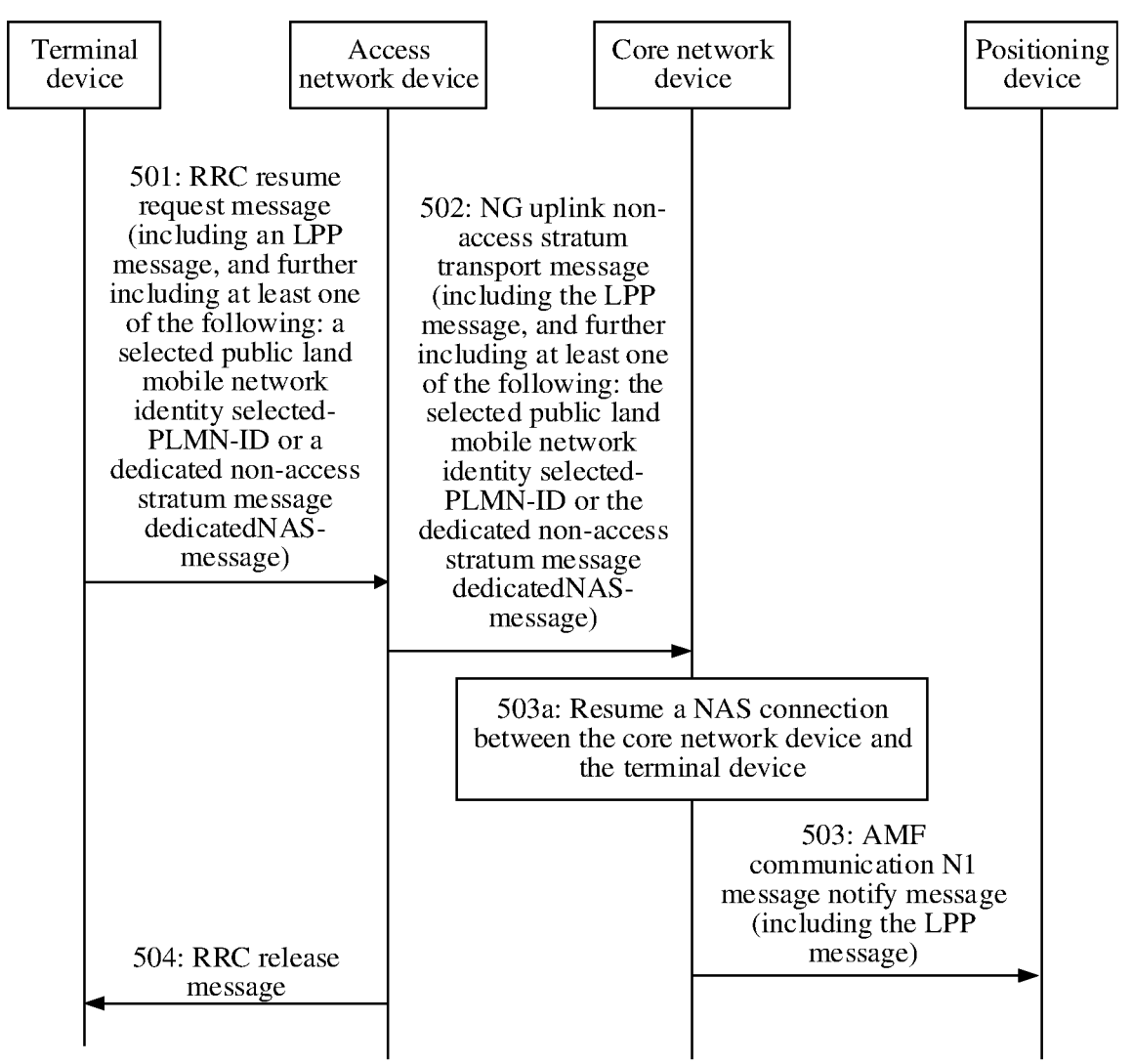

Terminal device | Access network device | Core network device | Positioning device 501: RRC resume request message (including an LPP message, and further including at least one of the following: a selected public land mobile network identity selected-PLMN-ID or a dedicated non-access stratum message dedicatedNAS-message)

502: NG uplink non-access stratum transport message (including the LPP message, and further including at least one of the following: the selected public land mobile network identity selected-PLMN-ID or the dedicated non-access stratum message dedicatedNAS-message)

503a: Resume a NAS connection between the core network device and the terminal device 503: AMF communication N1 message notify message (including the LPP message)

504: RRC release message

FIG. 5B

COMMUNICATION METHOD AND RELATED APPARATUS THEREOF

CROSS-REFERENCE TO RELATED APPLICATIONS

This application is a continuation of International Application No. PCT/CN2020/123144, filed on Oct. 23, 2020, the disclosure of which is hereby incorporated by reference in its entirety.

TECHNICAL FIELD

This application relates to communication technologies, and in particular, to a communication method and a related apparatus thereof.

BACKGROUND

A positioning function is an important function of 5G new radio (New Radio, NR). Currently, a location management function (location management function, LMF) device sends an LPP message to a terminal device in a connected state, to position the terminal device. However, when the terminal device is in a non-connected state, how the LMF device positions the terminal device is an urgent problem to be resolved currently.

SUMMARY

Embodiments of this application provide a communication method and a related apparatus thereof, to implement positioning of a terminal device in a non-connected state.

A first aspect of embodiments of this application provides a communication method, where the communication method includes:

A terminal device sends a radio resource control (RRC) resume request message to an access network device; and then the terminal device receives an RRC release message sent by the access network device, where the RRC release message includes an LPP message, and the LPP message is from a positioning device.

In this embodiment, the terminal device sends the RRC resume request message to the access network device. Therefore, it can be learned that there is no RRC connection between the terminal device and the access network device, that is, the terminal device is in a non-connected state. The access network device sends, to the terminal device via the RRC release message of the terminal device, the LPP message from the positioning device, so that the terminal device in the non-connected state obtains the LPP message of the positioning device, to position the terminal device. In other words, the terminal device does not need to access a network and enter a connected state before receiving the LPP message of the positioning device, to reduce a delay in delivering the LPP message by the positioning device. In addition, for a terminal device without a data service, the terminal device can obtain the LPP message in the non-connected state, to reduce power consumption of the UE.

In a possible implementation, the LPP message is carried in a long term evolution system positioning protocol protocol data unit (LPP PDU) of the RRC release message.

In this possible implementation, the LPP message is a positioning protocol message between the positioning device and the terminal device, and the RRC release message carries the LPP message in a form of the LPP PDU, to ensure isolation between different protocol layers and protection of data privacy. In addition, a specific format in which the RRC release message carries the LPP message is provided, to provide a basis for implementation of the solution.

In another possible implementation, the RRC release message includes a dedicated non-access stratum message (dedicatedNAS-message), the dedicatedNAS-message includes a first LPP PDU, and the first LPP PDU includes the LPP message.

In this possible implementation, the NAS message is a protocol layer message between a core network device and the terminal device, and the RRC release message carries the first LPP PDU by using a dedicatedNAS-message information element, to ensure privacy of data between the core network device and the terminal device. In addition, the RRC release message carries the LPP message in the form of the LPP PDU, to ensure isolation between different protocol layers. In addition, the information element that is in the RRC release message and that carries the LPP message is provided, to provide a basis for implementation of the solution.

In another possible implementation, the RRC release message further includes a routing identifier (routing ID), and the routing identifier identifies the positioning device.

In this possible implementation, the routing identifier identifies the positioning device. In this way, when the terminal device subsequently reports positioning information, the routing identifier may be carried, so that the core network device (for example, an access and mobility management function (AMF) determines the positioning device corresponding to the routing identifier, and then sends the positioning information of the terminal device to the positioning device.

In another possible implementation, the LPP message includes information indicating the terminal device in the non-connected state to report the positioning information of the terminal device to the positioning device.

In this possible implementation, the positioning device may indicate, by using the LPP message, the terminal device in the non-connected state to report the positioning information of the terminal device to the positioning device, so that the terminal device reports the positioning information in the non-connected state. The terminal device does not need to access the network and enter the connected state before reporting the positioning information of the terminal device to the positioning device, so that the terminal device reports the positioning information of the terminal device to the positioning device earlier, to avoid a delay caused by positioning of the terminal device.

In another possible implementation, the method further includes:

The terminal device in the non-connected state sends the positioning information of the terminal device to the positioning device.

In this possible implementation, the terminal device in the non-connected state reports the positioning information of the terminal device to the positioning device, and the terminal device does not need to access the network and enter the connected state before reporting the positioning information of the terminal device to the positioning device, so that the terminal device reports the positioning information of the terminal device to the positioning device earlier, to avoid the delay caused by positioning of the terminal device.

A second aspect of embodiments of this application provides a communication method, where the communication method includes:

An access network device receives an RRC resume request message from a terminal device; and then the access network device sends an RRC release message to the terminal device, where the RRC release message includes an LPP message, and the LPP message is from a positioning device.

In this embodiment, the access network device receives the RRC resume request message from the terminal device. Therefore, it can be learned that there is no RRC connection between the terminal device and the access network device, that is, the terminal device is in a non-connected state. The access network device sends, to the terminal device via the RRC release message of the terminal device, the LPP message from the positioning device, so that the terminal device in the non-connected state obtains the LPP message of the positioning device, to position the terminal device. In other words, the terminal device does not need to access a network and enter a connected state before the LPP message of the positioning device is sent to the terminal device, so that the terminal device can obtain the LPP message from the positioning device earlier, to reduce a delay in delivering the LPP message by the positioning device. In addition, for a terminal device without a data service, the terminal device can obtain the LPP message in the non-connected state, to reduce power consumption of the UE.

In a possible implementation, the LPP message is carried in a first LPP PDU of the RRC release message.

In this possible implementation, the LPP message is a positioning protocol message between the positioning device and the terminal device, and the RRC release message carries the LPP message in a form of the LPP PDU, to ensure isolation between different protocol layers and protection of data privacy. In addition, a specific format in which the RRC release message carries the LPP message is provided, to provide a basis for implementation of the solution.

In another possible implementation, the RRC release message includes a dedicated non-access stratum message dedicatedNAS-message, the dedicatedNAS-message includes the first LPP PDU, and the first LPP PDU includes the LPP message.

In this possible implementation, the NAS message is a protocol layer message between a core network device and the terminal device, and the RRC release message carries the first LPP PDU by using a dedicatedNAS-message information element, to ensure privacy of data between the core network device and the terminal device. In addition, the RRC release message carries the LPP message in the form of the LPP PDU, to ensure isolation between different protocol layers. In addition, the information element that is in the RRC release message and that carries the LPP message is provided, to provide a basis for implementation of the solution.

In another possible implementation, the RRC release message further includes a routing identifier, and the routing identifier identifies the positioning device.

In this possible implementation, the routing identifier identifies the positioning device. In this way, when the terminal device subsequently reports positioning information, the routing identifier may be carried, so that the core network device (for example, an AMF) determines the positioning device corresponding to the routing identifier, and then sends the positioning information of the terminal device to the positioning device.

In another possible implementation, the LPP message includes information indicating the terminal device in the non-connected state to report the positioning information of the terminal device to the positioning device.

In this possible implementation, the positioning device may indicate, by using the LPP message, the terminal device in the non-connected state to report the positioning information of the terminal device to the positioning device, so that the terminal device reports the positioning information in the non-connected state. The terminal device does not need to access the network and enter the connected state before reporting the positioning information of the terminal device to the positioning device, so that the terminal device obtains the LPP message from the positioning device earlier, to reduce the delay in delivering the LPP message by the positioning device.

In another possible implementation, the method further includes: The access network device receives, from the core network device, a first non-access stratum protocol data unit (NAS PDU) and information indicating that the first NAS PDU includes a second LPP PDU, where the first NAS PDU includes the second LPP PDU, and the second LPP PDU includes the LPP message.

In this possible implementation, the NAS message is a protocol layer message between the core network device and the terminal device, and the core network device sends the second LPP PDU to the access network device via the first NAS PDU, to ensure privacy of data between the core network device and the terminal device. In addition, the first NAS PDU carries the LPP message in the form of the LPP PDU, to ensure isolation between different protocol layers. In addition, the access network device further receives the information indicating that the first NAS PDU includes the second LPP PDU. In this way, the access network device can be indicated to deliver the second LPP PDU to the terminal device, so that the terminal device obtains the LPP message from the positioning device earlier.

In another possible implementation, the method further includes: The access network device sends a retrieve UE context request message to a source access network device. Then, the access network device receives a retrieve UE context response message from the source access network device, where the retrieve UE context response message includes the LPP message.

In this possible implementation, when the terminal device moves to a coverage area of the access network device, and the source access network device obtains the LPP message sent by the positioning device to the terminal device, the access network device to which the terminal device moves may obtain, in a retrieve UE context interaction process, the LPP message sent by the positioning device to the terminal device, so that the access network device delivers, to the terminal device via the RRC release message, the LPP message from the positioning device earlier and more quickly, to reduce the delay in delivering the LPP message by the positioning device.

In another possible implementation, the LPP message is carried in a third LPP PDU of the retrieve UE context response message.

In this possible implementation, the LPP message is a positioning protocol message between the positioning device and the terminal device, and the retrieve UE context response message carries the LPP message in the form of the LPP PDU, to ensure isolation between different protocol layers and protection of data privacy. In addition, a specific format in which the retrieve UE context response message carries the LPP message is provided, to provide a basis for implementation of the solution.

In another possible implementation, the retrieve UE context response message includes a second NAS PDU, the second NAS PDU includes the third LPP PDU, and the third LPP PDU includes the LPP message.

In this possible implementation, the NAS message is a protocol layer message between the core network device and the terminal device, and the retrieve UE context response message carries the third LPP PDU by using the second NAS PDU, to ensure privacy of data between the core network device and the terminal device. In addition, the retrieve UE context response message carries the LPP message in the form of the LPP PDU, to ensure isolation between different protocol layers. A specific information element that is in the retrieve UE context response message and that carries the LPP message is provided, to provide a basis for implementation of the solution.

In another possible implementation, the retrieve UE context response message further includes information indicating that the second NAS PDU includes the third LPP PDU.

In this possible implementation, the retrieve UE context response message further includes the information indicating that the second NAS PDU includes the third LPP PDU. In this way, the access network device can be indicated to deliver the third LPP PDU to the terminal device, so that the terminal device obtains the LPP message from the positioning device earlier, to reduce the delay in delivering the LPP message by the positioning device.

In another possible implementation, the retrieve UE context response message includes information indicating the source access network device to send the LPP message or the NAS message to the terminal device, and the NAS message includes the LPP message.

In this possible implementation, another indication manner for indicating the access network device to further deliver the LPP message to the terminal device is provided, so that the terminal device obtains the LPP message from the positioning device earlier, to reduce the delay in delivering the LPP message by the positioning device.

In another possible implementation, before that the access network device sends a retrieve UE context request message to a source access network device, the method further includes: The access network device receives an access network paging message from the source access network device, where the access network paging message includes the information indicating the source access network device to send the LPP message or the NAS message to the terminal device, and the NAS message includes the LPP message.

In this possible implementation, an indication manner for indicating, by using the access network paging message, the source access network device to send the LPP message to the terminal device is provided, to indicate the access network device to send, to the terminal device, the LPP message sent by the source access network device, so that the terminal device obtains the LPP message from the positioning device earlier, to reduce the delay in delivering the LPP message by the positioning device.

A third aspect of embodiments of this application provides a communication method, where the communication method includes:

A source access network device receives a retrieve UE context request message from an access network device; and the source access network device sends a retrieve UE context response message to the access network device, where the retrieve UE context response message includes an LPP message, and the LPP message is from a positioning device.

In this embodiment, a terminal device moves to a coverage area of the access network device, and there is no RRC connection between the terminal device and the access network device. In a UE context request process of the access network device, the source access network device may send, to the access network device, the LPP message from the positioning device, so that the access network device sends, to the terminal device via an RRC release message of the terminal device, the LPP message from the positioning device. Therefore, the terminal device in a non-connected state obtains the LPP message from the positioning device, to position the terminal device. In other words, the terminal device does not need to access a network and enter a connected state before the LPP message of the positioning device is sent to the terminal device, to reduce a delay in delivering the LPP message by the positioning device. In addition, for a terminal device without a data service, the terminal device can obtain the LPP message in the non-connected state, to reduce power consumption of the UE.

In a possible implementation, the LPP message is carried in a third LPP PDU of the retrieve UE context response message.

In this possible implementation, a specific format in which the retrieve UE context response message carries the LPP message is provided.

In another possible implementation, the retrieve UE context response message includes a second NAS PDU, the second NAS PDU includes the third LPP PDU, and the third LPP PDU includes the LPP message.

In this possible implementation, the LPP message is a positioning protocol message between the positioning device and the terminal device, and the retrieve UE context response message carries the LPP message in a form of the LPP PDU, to ensure isolation between different protocol layers and protection of data privacy. In addition, a specific information element that is in the retrieve UE context response message and that carries the third LPP PDU is provided, to provide a basis for implementation of the solution.

In another possible implementation, the retrieve UE context response message further includes information indicating that the second NAS PDU includes the third LPP PDU.

In this possible implementation, the retrieve UE context response message further includes the information indicating that the second NAS PDU includes the third LPP PDU. In this way, the access network device can be indicated to deliver the third LPP PDU to the terminal device, so that the terminal device obtains the LPP message from the positioning device earlier, to reduce the delay in delivering the LPP message by the positioning device.

In another possible implementation, the retrieve UE context response message includes information indicating the source access network device to send the LPP message or a NAS message to the terminal device, and the NAS message includes the LPP message.

In this possible implementation, another indication manner for indicating the access network device to further deliver the LPP message to the terminal device is provided, so that the terminal device obtains the LPP message from the positioning device earlier, to reduce the delay in delivering the LPP message by the positioning device.

In another possible implementation, before that a source access network device receives a retrieve UE context request message from an access network device, the method further includes: The source access network device sends an access network paging message to the access network device, where the access network paging message includes the information indicating the source access network device to send the LPP message or the NAS message to the terminal device, and the NAS message includes the LPP message.

In this possible implementation, an indication manner for indicating, by using the access network paging message, the source access network device to send the LPP message to the terminal device is provided, to indicate the access network device to send, to the terminal device, the LPP message sent by the source access network device, so that the terminal device obtains the LPP message from the positioning device earlier, to reduce the delay in delivering the LPP message by the positioning device.

In another possible implementation, the method further includes:

The source access network device receives, from a core network device, a first NAS PDU and information indicating that the first NAS PDU includes a second LPP PDU, where the first NAS PDU includes the second LPP PDU, and the second LPP PDU includes the LPP message.

In this possible implementation, the NAS message is a protocol layer message between the core network device and the terminal device, and the core network device sends the second LPP PDU to the source access network device via the first NAS PDU, to ensure privacy of data between the core network device and the terminal device. In addition, the first NAS PDU carries the LPP message in the form of the LPP PDU, to ensure isolation between different protocol layers. In addition, the source access network device further receives the information indicating that the first NAS PDU includes the second LPP PDU, to indicate the source access network device to deliver the second LPP PDU to the terminal device, so that the terminal device obtains the LPP message from the positioning device earlier.

A fourth aspect of embodiments of this application provides a communication method, where the communication method includes:

A terminal device sends an RRC request message to an access network device, where the RRC request message includes an LPP message, the LPP message is from the terminal device, and the terminal device is in a non-connected state; and the terminal device receives an RRC release message sent by the first access network device.

In this embodiment, the terminal device in the non-connected state reports the LPP message to a positioning device via the RRC request message, and the terminal device does not need to initiate access and enter a connected state before sending the LPP message of the terminal device to the positioning device. The terminal device may report the LPP message to the positioning device earlier, to reduce a delay in sending the LPP message by the terminal device to the positioning device, and avoid an extra delay caused by positioning of the terminal device. In addition, the terminal device in the non-connected state may report the LPP message to the positioning device. For a terminal device without a data service, the terminal device keeps in the non-connected state, to reduce power consumption of the terminal device.

In a possible implementation, when the terminal device is in an inactive state, the RRC request message is an RRC resume request message. When the terminal device is in an idle state, the RRC request message is an RRC setup request message.

In this possible implementation, specific forms of two non-connected states of the terminal device are shown, and specific forms of the RRC request message in the two specific non-connected states of the terminal device are provided, to improve implementability and diversity of the solution.

In another possible implementation, the RRC request message is an RRC early data request message.

In this possible implementation, a specific form of a newly defined RRC request message is provided, and the newly defined RRC request message may be the RRC early data request message used by the terminal device to send data or information to a network. In actual application, the newly defined message may alternatively have another name. This is not specifically limited in this application.

In another possible implementation, if the RRC request message is the RRC resume request message, the RRC resume request message includes at least one of the following: a selected public land mobile network identity (selected-PLMN-ID) or a dedicatedNAS-message.

If the RRC request message is the RRC setup request message, the RRC setup request message includes at least one of the following: a selected public land mobile network identity, a dedicatedNAS-message, a 5G-S temporary mobile subscriber identity (5G-S-TMSI), or a registered access and mobility management function (RegisteredAMF).

In this possible implementation, the RRC resume request message further includes some or all of information elements of an RRC resume complete message in an existing process, and the RRC setup request message further includes some or all of information elements of an RRC setup complete message in the existing process. In other words, a message 3 in an existing RRC resume request process or an RRC setup request process includes an information element of a message 5, so that a NAS connection between a core network device and the terminal device is resumed or set up, to reduce signaling interaction. The NAS connection between the core network device and the terminal device is quickly resumed or set up, so that the core network device can report, to the positioning device, the LPP message from the terminal device earlier.

In another possible implementation, the LPP message is carried in an LPP PDU of the RRC request message.

In this possible implementation, the LPP message is a positioning protocol message between the positioning device and the terminal device, and the RRC request message carries the LPP message in a form of the LPP PDU, to ensure isolation between different protocol layers and protection of data privacy. In addition, a specific format in which the RRC request message carries the LPP message is provided, to provide a basis for implementation of the solution.

In another possible implementation, the RRC request message includes the dedicatedNAS-message, the dedicatedNAS-message includes the LPP PDU, and the LPP PDU includes the LPP message.

In this possible implementation, the NAS message is a protocol layer message between the core network device and the terminal device, and the RRC request message carries the LPP PDU by using a dedicatedNAS-message information element, to ensure privacy of data between the core network device and the terminal device. In addition, the RRC request message carries the LPP message in the form of the LPP PDU, to ensure isolation between different protocol layers. In addition, the information element that is in the RRC request message and that carries the LPP message is provided, to provide a basis for implementation of the solution.

In another possible implementation, the RRC request message further includes a cause value, the cause value indicates that the RRC request message is used for reporting any one of the following information: the LPP message, the NAS message, or positioning information of the terminal device, and the NAS message includes the LPP message.

In this possible implementation, the terminal device includes the cause value in the RRC request message, to indicate that the RRC request message is used by the terminal device to report the LPP message, the NAS message, or the positioning information of the terminal device. In this way, the access network device can subsequently send the RRC release message, so that the terminal device keeps in the non-connected state. For a terminal without a data service, the terminal device keeps in the non-connected state, to reduce power consumption of the terminal device.

In another possible implementation, the RRC request message further includes a routing identifier, and the routing identifier identifies the positioning device.

In this possible implementation, the routing identifier identifies the positioning device. In this way, the core network device (for example, an AMF) can determine the positioning device corresponding to the routing identifier, and then send the LPP message of the terminal device to the positioning device.

A fifth aspect of embodiments of this application provides a communication method, where the communication method includes:

An access network device receives an RRC request message from a terminal device, where the RRC request message includes an LPP message, the LPP message is from the terminal device, and the terminal device is in a non-connected state; the access network device sends the LPP message to a core network device; and the access network device sends an RRC release message to the terminal device.

In this embodiment, the terminal device in the non-connected state reports the LPP message to a positioning device via the RRC request message, and the terminal device does not need to initiate access and enter a connected state before sending the LPP message of the terminal device to the positioning device. The terminal device may report the LPP message to the positioning device earlier, to reduce a delay in sending the LPP message by the terminal device to the positioning device, and avoid an extra delay caused by positioning of the terminal device. In addition, the terminal device in the non-connected state may report the LPP message to the positioning device. For a terminal device without a data service, the terminal device keeps in the non-connected state, to reduce power consumption of the terminal device.

In a possible implementation, when the terminal device is in an inactive state, the RRC request message is an RRC resume request message. When the terminal device is in an idle state, the RRC request message is an RRC setup request message.

In this possible implementation, specific forms of two non-connected states of the terminal device are shown, and specific forms of the RRC request message in the two specific non-connected states of the terminal device are provided, to improve implementability and diversity of the solution.

In another possible implementation, the RRC request message is an RRC early data request message.

In this possible implementation, a specific form of a newly defined RRC request message is provided, and the newly defined RRC request message may be the RRC early data request message used by the terminal device to send data or information to a network. In actual application, the newly defined message may alternatively have another name. This is not specifically limited in this application.

In another possible implementation, if the RRC request message is the RRC resume request message, the RRC resume request message includes at least one of the following: a selected public land mobile network identity or a dedicatedNAS-message.

If the RRC request message is the RRC setup request message, the RRC setup request message includes at least one of the following: a selected public land mobile network identity, a dedicatedNAS-message, a 5G-S temporary mobile subscriber identity (5G-S-TMSI), or a registered access and mobility management function (RegisteredAMF). In this possible implementation, the RRC resume request message further includes some or all of information elements of an RRC resume complete message in an existing process, and the RRC setup request message further includes some or all of information elements of an RRC setup complete message in the existing process. In other words, a message 3 in an existing RRC resume request process or an RRC setup request process includes an information element of a message 5, so that a NAS connection between the core network device and the terminal device is resumed or set up, to reduce signaling interaction. The NAS connection between the core network device and the terminal device is quickly resumed or set up, so that the core network device can report, to the positioning device, the LPP message from the terminal device earlier.

In another possible implementation, the LPP message is carried in an LPP PDU of the RRC request message.

In this possible implementation, the LPP message is a positioning protocol message between the positioning device and the terminal device, and the RRC request message carries the LPP message in a form of the LPP PDU, to ensure isolation between different protocol layers and protection of data privacy. In addition, a specific format in which the RRC request message carries the LPP message is provided, to provide a basis for implementation of the solution.

In another possible implementation, the RRC request message includes the dedicatedNAS-message, the dedicatedNAS-message includes the LPP PDU, and the LPP PDU includes the LPP message.

In this possible implementation, the NAS message is a protocol layer message between the core network device and the terminal device, and the RRC request message carries the LPP PDU by using a dedicatedNAS-message information element, to ensure privacy of data between the core network device and the terminal device. In addition, the RRC request message carries the LPP message in the form of the LPP PDU, to ensure isolation between different protocol layers. In addition, the information element that is in the RRC request message and that carries the LPP message is provided, to provide a basis for implementation of the solution.

In another possible implementation, the RRC request message further includes a cause value, the cause value indicates that the RRC request message is used for reporting any one of the following information: the LPP message, the NAS message, or positioning information of the terminal device, and the NAS message includes the LPP message.

In this possible implementation, the terminal device includes the cause value in the RRC request message, to indicate that the RRC request message is used by the terminal device to report the LPP message, the NAS message, or the positioning information of the terminal device.

In this way, the access network device can subsequently send the RRC release message, so that the terminal device keeps in the non-connected state. For a terminal without a data service, the terminal device keeps in the non-connected state, to reduce power consumption of the terminal device.

In another possible implementation, the RRC request message further includes a routing identifier, and the routing identifier identifies the positioning device.

In this possible implementation, the routing identifier identifies the positioning device. In this way, the core network device (for example, an AMF) can determine the positioning device corresponding to the routing identifier, and then send the LPP message of the terminal device to the positioning device.

In another possible implementation, that the access network device sends the LPP message to a core network device includes:

The access network device sends an initial UE message to the core network device, where the initial UE message includes the LPP message; or the access network device sends an NG uplink non-access stratum transport message to the core network device, where the NG uplink non-access stratum transport message includes the LPP message.

In a possible implementation, in the RRC setup request process, the access network device may send the LPP message to the core network device via the initial UE message, so that the core network device reports the LPP message to the positioning device. Therefore, the terminal device reports the LPP message to the positioning device earlier, to reduce the delay in sending the LPP message by the terminal device to the positioning device, and avoid the extra delay caused by positioning of the terminal device. In the RRC resume request process, the access network device may send the LPP message to the core network device via the NG uplink non-access stratum transport message, so that the core network device reports the LPP message to the positioning device. Therefore, the terminal device reports the LPP message to the positioning device earlier, to reduce the delay in sending the LPP message by the terminal device to the positioning device, and avoid the extra delay caused by positioning of the terminal device. In other words, a form of a specific message carrying the LPP message reported by the access network device to the core network device in the RRC setup process or the RRC resume process of the terminal device is provided.

In another possible implementation, the initial UE message includes a NAS PDU, the NAS PDU includes a second LPP PDU, and the second LPP PDU includes the LPP message.

In this possible implementation, the NAS message is a protocol layer message between the core network device and the terminal device, and the access network device sends the second LPP PDU to the core network device via the NAS PDU of the initial UE message, to ensure privacy of data between the core network device and the terminal device. In addition, the NAS PDU carries the LPP message in the form of the LPP PDU, to ensure isolation between different protocol layers. In addition, a specific information element that is in the initial UE message and that carries the LPP message is provided, to provide a basis for implementation of the solution.

In another possible implementation, the NG uplink non-access stratum transport message includes a NAS PDU, the NAS PDU includes a second LPP PDU, and the second LPP PDU includes the LPP message.

In this possible implementation, the NAS message is a protocol layer message between the core network device and the terminal device, and the access network device sends the second LPP PDU to the core network device via the NAS PDU of the NG uplink non-access stratum transport message, to ensure privacy of data between the core network device and the terminal device. In addition, the NAS PDU carries the LPP message in the form of the LPP PDU, to ensure isolation between different protocol layers. In addition, a specific information element that is in the NG uplink non-access stratum transport message and that carries the LPP message is provided, to provide a basis for implementation of the solution.

A sixth aspect of embodiments of this application provides a communication method, where the communication method includes:

A core network device receives an initial UE message from an access network device, where the initial UE message includes an LPP message, and the LPP message is from a terminal device; and the core network device sends an NL1 protocol interface message to a positioning device, where the NL1 protocol interface message includes the LPP message.

In this embodiment, the core network device receives the LPP message from the terminal device via the initial UE message, and then sends the LPP message to the positioning device via the NL1 protocol interface message, so that the terminal device in a non-connected state reports the LPP message to the positioning device. The terminal device does not need to initiate access and enter a connected state before sending the LPP message of the terminal device to the positioning device, so that the terminal device can report the LPP message to the positioning device earlier, to reduce a delay in sending the LPP message by the terminal device to the positioning device, and avoid an extra delay caused by positioning of the terminal device. In addition, the terminal device in the non-connected state may report the LPP message to the positioning device. For a terminal device without a data service, the terminal device keeps in the non-connected state, to reduce power consumption of the terminal device.

In a possible implementation, the LPP message is carried in an LPP PDU in the initial UE message.

In this possible implementation, the LPP message is a positioning protocol message between the positioning device and the terminal device, and the initial UE message carries the LPP message in a form of the LPP PDU, to ensure isolation between different protocol layers and protection of data privacy. In addition, a specific format in which the initial UE message carries the LPP message is provided.

In another possible implementation, the initial UE message includes a NAS PDU, the NAS PDU includes a second LPP PDU, and the second LPP PDU includes the LPP message.

In this possible implementation, a NAS message is a protocol layer message between the core network device and the terminal device, and the access network device sends the second LPP PDU to the core network device via the NAS PDU of the initial UE message, to ensure privacy of data between the core network device and the terminal device. In addition, the NAS PDU carries the LPP message in the form of the LPP PDU, to ensure isolation between different protocol layers. In addition, a specific information element that is in the initial UE message and that carries the LPP message is provided, to provide a basis for implementation of the solution.

In another possible implementation, the initial UE message further includes a routing identifier. Before that the core network device sends the LPP message to the positioning device, the method further includes: The core network device determines the positioning device corresponding to the routing identifier included in the initial UE message.

In this possible implementation, the core network device finds the corresponding positioning device based on the routing identifier carried in the initial UE message, and then sends, to the positioning device, the LPP message from the terminal device.

In another possible implementation, the NL1 protocol interface message includes a third LPP PDU, and the third LPP PDU includes the LPP message.

In this possible implementation, the LPP message is a positioning protocol message between the positioning device and the terminal device, and the NL1 protocol interface message carries the LPP message in the form of the LPP PDU, to ensure isolation between different protocol layers and protection of data privacy.

In another possible implementation, the NL1 protocol interface message is an AMF communication N1 message notify message or an AMF communication non-user N2 information notify message.

In this possible implementation, two possible implementations of the NL1 protocol interface message are provided. If no NAS connection is set up between the terminal device and the core network device, the NL1 protocol interface message is the AMF communication non-user N2 information notify message. If a NAS connection is set up between the terminal device and the core network device, the NL1 protocol interface message is the AMF communication N1 message.

A seventh aspect of embodiments of this application provides a communication method, where the communication method includes:

A terminal device receives a request location information message from a positioning device, where the request location information message includes information indicating the terminal device in a non-connected state to report positioning information of the terminal device to the positioning device, or includes information indicating the terminal device to report positioning information of the terminal device to the positioning device on a preconfigured uplink resource; then the terminal device sends a request message to an access network device based on the request location information message, where the request message is for requesting the preconfigured uplink resource; and the terminal device receives an RRC release message from the access network device, where the RRC release message includes configuration information of the preconfigured uplink resource allocated by the access network device to the terminal device.

In this embodiment, in the foregoing technical solution, the terminal device may determine an uplink resource based on the configuration information of the preconfigured uplink resource, and send an RRC request message to the access network device on the preconfigured uplink resource, to report an LPP message of the terminal device, so that the terminal device in the non-connected state sends the LPP message to the positioning device. The terminal device does not need to initiate access and enter a connected state before sending the LPP message of the terminal device to the positioning device, to reduce a delay in sending the LPP message by the terminal device to the positioning device, and avoid an extra delay caused by positioning of the terminal device by the positioning device. In addition, the terminal device in the non-connected state may report the LPP message to the positioning device. For a terminal device without a data service, the terminal device keeps in the non-connected state, to reduce power consumption of the terminal device.

In a possible implementation, the method further includes: The terminal device determines the uplink resource based on the configuration information of the preconfigured uplink resource; and then the terminal device sends the RRC request message to the access network device on the uplink resource, where the RRC request message includes the LPP message, and the LPP message is from the terminal device.

In this possible implementation, the terminal device may determine the uplink resource based on the configuration information of the preconfigured uplink resource, and send the RRC request message to the access network device on the uplink resource, to report the LPP message of the terminal device, so that the terminal device in the non-connected state sends the LPP message to the positioning device.

In another possible implementation, before that a terminal device receives a request location information message from a positioning device, the method further includes: The terminal device sends capability information of the terminal device to the positioning device, where the capability information indicates whether the terminal device supports a capability of reporting the positioning information of the terminal device to the positioning device on the preconfigured uplink resource.

In this possible implementation, the terminal device indicates, by using the capability information, whether the terminal device supports reporting the positioning information on the preconfigured uplink resource, so that the positioning device determines a manner of reporting the LPP message by the terminal device.

In another possible implementation, that the terminal device sends capability information of the terminal device to the positioning device includes: The terminal device sends a provide capability message to the positioning device, where the provide capability message includes the capability information of the terminal device.

In this possible implementation, a specific message that carries the capability information of the terminal device is provided.

In another possible implementation, the LPP message is carried in an LPP PDU of the RRC request message.

In this possible implementation, the LPP message is a positioning protocol message between the positioning device and the terminal device, and the RRC request message carries the LPP message in a form of the LPP PDU, to ensure isolation between different protocol layers and protection of data privacy. In addition, a specific format in which the RRC request message carries the LPP message is provided.

In another possible implementation, the RRC request message includes a dedicatedNAS-message, the dedicatedNAS-message includes the LPP PDU, and the LPP PDU includes the LPP message.

In this possible implementation, the NAS message is a protocol layer message between a core network device and the terminal device, and the RRC request message carries the LPP PDU by using a dedicatedNAS-message information element, to ensure privacy of data between the core network device and the terminal device. In addition, the RRC request message carries the LPP message in the form of the LPP PDU, to ensure isolation between different protocol layers. In addition, the information element that is in the RRC request message and that carries the LPP message is provided, to provide a basis for implementation of the solution.

In another possible implementation, the RRC request message further includes a cause value, the cause value indicates that the RRC request message is used for reporting any one of the following information: the LPP message, the NAS message, or the positioning information of the terminal device, and the NAS message includes the LPP message.

In this possible implementation, the terminal device includes the cause value in the RRC request message, to indicate that the RRC request message is used by the terminal device to report the LPP message, the NAS message, or the positioning information of the terminal device. In this way, the access network device can subsequently send the RRC release message, so that the terminal device keeps in the non-connected state. For a terminal without a data service, the terminal device keeps in the non-connected state, to reduce power consumption of the terminal device.

An eighth aspect of embodiments of this application provides a communication method, where the communication method includes:

An access network device receives an RRC request message from a terminal device, where the RRC request message includes an LPP message, and the LPP message is from the terminal device; and the access network device sends an initial UE message to a core network device, where the initial UE message includes the LPP message.

In this embodiment, the access network device receives the RRC request message from the terminal device, where the RRC request message includes the LPP message, so that the terminal device in a non-connected state sends the LPP message to a positioning device. The terminal device does not need to initiate access and enter a connected state before sending the LPP message of the terminal device to the positioning device, to reduce a delay in sending the LPP message by the terminal device to the positioning device, and avoid an extra delay caused by positioning of the terminal device by the positioning device. In addition, the terminal device in the non-connected state may report the LPP message to the positioning device. For a terminal device without a data service, the terminal device keeps in the non-connected state, to reduce power consumption of the terminal device.

In another possible implementation, the LPP message is carried in an LPP PDU of the RRC request message.

In this possible implementation, the LPP message is a positioning protocol message between the positioning device and the terminal device, and the RRC request message carries the LPP message in a form of the LPP PDU, to ensure isolation between different protocol layers and protection of data privacy. In addition, a specific format in which the RRC request message carries the LPP message is provided.

In another possible implementation, the RRC request message includes a dedicatedNAS-message, the dedicatedNAS-message includes the LPP PDU, and the LPP PDU includes the LPP message.

In this possible implementation, the NAS message is a protocol layer message between the core network device and the terminal device, and the RRC request message carries the LPP PDU by using a dedicatedNAS-message information element, to ensure privacy of data between the core network device and the terminal device. In addition, the RRC request message carries the LPP message in the form of the LPP PDU, to ensure isolation between different protocol layers. In addition, the information element that is in the RRC request message and that carries the LPP message is provided, to provide a basis for implementation of the solution.

In another possible implementation, the RRC request message further includes a cause value, the cause value indicates that the RRC request message is used for reporting any one of the following information: the LPP message, the NAS message, or positioning information of the terminal device, and the NAS message includes the LPP message.

In this possible implementation, the terminal device includes the cause value in the RRC request message, to indicate that the RRC request message is used by the terminal device to report the LPP message, the NAS message, or the positioning information of the terminal device. In this way, the access network device can subsequently send an RRC release message, so that the terminal device keeps in the non-connected state. For a terminal without a data service, the terminal device keeps in the non-connected state, to reduce power consumption of the terminal device.

In another possible implementation, the initial UE message includes a NAS PDU, the NAS PDU includes a second LPP PDU, and the second LPP PDU includes the LPP message.

In this possible implementation, a specific format in which the initial UE message carries the LPP message is provided.

A ninth aspect of embodiments of this application provides a communication apparatus, where the communication apparatus includes:

a sending unit, configured to send an RRC resume request message to an access network device; and a receiving unit, configured to receive an RRC release message sent by the access network device, where the RRC release message includes an LPP message, and the LPP message is from a positioning device.

In a possible implementation, the LPP message is carried in an LPP PDU of the RRC release message.

In another possible implementation, the RRC release message includes a dedicated non-access stratum message (dedicatedNAS-message), the dedicatedNAS-message includes a first LPP PDU, and the first LPP PDU includes the LPP message.

In another possible implementation, the RRC release message further includes a routing identifier (routing ID), and the routing identifier identifies the positioning device.

In another possible implementation, the LPP message includes information indicating the communication apparatus in a non-connected state to report positioning information of the communication apparatus to the positioning device.

In another possible implementation, the sending unit is further configured to:

send, in the non-connected state, the positioning information of the communication apparatus to the positioning device.

A tenth aspect of embodiments of this application provides a communication apparatus, where the communication apparatus includes:

a receiving unit, configured to receive an RRC resume request message from a terminal device; and a sending unit, configured to send an RRC release message to the terminal device, where the RRC release message includes an LPP message, and the LPP message is from a positioning device.

In a possible implementation, the LPP message is carried in a first LPP PDU of the RRC release message.

In another possible implementation, the RRC release message includes a dedicated non-access stratum message dedicatedNAS-message, the dedicatedNAS-message includes the first LPP PDU, and the first LPP PDU includes the LPP message.

In another possible implementation, the RRC release message further includes a routing identifier, and the routing identifier identifies the positioning device.

In another possible implementation, the LPP message includes information indicating the terminal device in a non-connected state to report positioning information of the terminal device to the positioning device.

In another possible implementation, the receiving unit is further configured to:

receive, from a core network device, a first NAS PDU and information indicating that the first NAS PDU includes a second LPP PDU, where the first NAS PDU includes the second LPP PDU, and the second LPP PDU includes the LPP message.

In another possible implementation, the sending unit is further configured to:

send a retrieve UE context request message to a source access network device.

The receiving unit is further configured to:

receive a retrieve UE context response message from the source access network device, where the retrieve UE context response message includes the LPP message.

In another possible implementation, the LPP message is carried in a third LPP PDU of the retrieve UE context response message.

In another possible implementation, the retrieve UE context response message includes a second NAS PDU, the second NAS PDU includes the third LPP PDU, and the third LPP PDU includes the LPP message.

In another possible implementation, the retrieve UE context response message further includes information indicating that the second NAS PDU includes the third LPP PDU.

In another possible implementation, the retrieve UE context response message includes information indicating the source access network device to send the LPP message or a NAS message to the terminal device, and the NAS message includes the LPP message.

In another possible implementation, the receiving unit is further configured to:

receive an access network paging message from the source access network device, where the access network paging message includes the information indicating the source access network device to send the LPP message or the NAS message to the terminal device, and the NAS message includes the LPP message.

An eleventh aspect of embodiments of this application provides a communication apparatus, where the communication apparatus includes:

a receiving unit, configured to receive a retrieve UE context request message from an access network device; and a sending unit, configured to send a retrieve UE context response message to the access network device, where the retrieve UE context response message includes an LPP message, and the LPP message is from a positioning device.

In a possible implementation, the LPP message is carried in a third LPP PDU of the retrieve UE context response message.

In another possible implementation, the retrieve UE context response message includes a second NAS PDU, the second NAS PDU includes the third LPP PDU, and the third LPP PDU includes the LPP message.

In another possible implementation, the retrieve UE context response message further includes information indicating that the second NAS PDU includes the third LPP PDU.

In another possible implementation, the retrieve UE context response message includes information indicating the communication apparatus to send the LPP message or a NAS message to the terminal device, and the NAS message includes the LPP message.

In another possible implementation, the sending unit is further configured to:

send an access network paging message to the access network device, where the access network paging message includes the information indicating the communication apparatus to send the LPP message or the NAS message to the terminal device, and the NAS message includes the LPP message.

In another possible implementation, the receiving unit is further configured to:

receive, from a core network device, a first NAS PDU and information indicating that the first NAS PDU includes a second LPP PDU, where the second LPP PDU includes the LPP message.

A twelfth aspect of embodiments of this application provides a communication apparatus, where the communication apparatus includes:

a sending unit, configured to send an RRC request message to an access network device, where the RRC request message includes an LPP message, the LPP message is from a terminal device, and the communication apparatus is in a non-connected state; and a receiving unit, configured to receive an RRC release message sent by the first access network device.

In a possible implementation, when the communication apparatus is in an inactive state, the RRC request message is an RRC resume request message. When the communication apparatus is in an idle state, the RRC request message is an RRC setup request message.

In another possible implementation, the RRC request message is an RRC early data request message.

In another possible implementation, if the RRC request message is the RRC resume request message, the RRC resume request message includes at least one of the following: a selected public land mobile network identity or a dedicatedNAS-message.

If the RRC request message is the RRC setup request message, the RRC setup request message includes at least one of the following: a selected public land mobile network identity, a dedicatedNAS-message, a 5G-S-TMSI, or a RegisteredAMF.

In another possible implementation, the LPP message is carried in an LPP PDU of the RRC request message.

In another possible implementation, the RRC request message includes the dedicatedNAS-message, the dedicatedNAS-message includes the LPP PDU, and the LPP PDU includes the LPP message.

In another possible implementation, the RRC request message further includes a cause value, the cause value indicates that the RRC request message is used for reporting any one of the following information: the LPP message, a NAS message, or positioning information of the communication apparatus, and the NAS message includes the LPP message.

In another possible implementation, the RRC request message further includes a routing identifier, and the routing identifier identifies a positioning device.

A thirteenth aspect of embodiments of this application provides a communication apparatus, where the communication apparatus includes:

a receiving unit, configured to receive an RRC request message from a terminal device, where the RRC request message includes an LPP message, the LPP message is from the terminal device, and the terminal device is in a non-connected state; and a sending unit, configured to send the LPP message to a core network device, and send an RRC release message to the terminal device.

In a possible implementation, when the terminal device is in an inactive state, the RRC request message is an RRC resume request message. When the terminal device is in an idle state, the RRC request message is an RRC setup request message.

In another possible implementation, the RRC request message is an RRC early data request message.

In another possible implementation, if the RRC request message is the RRC resume request message, the RRC resume request message includes at least one of the following: a selected public land mobile network identity or a dedicatedNAS-message.

If the RRC request message is the RRC setup request message, the RRC setup request message includes at least one of the following: a selected public land mobile network identity, a dedicatedNAS-message, a 5G-S-TMSI, or a RegisteredAMF.

In another possible implementation, the LPP message is carried in an LPP PDU of the RRC request message.

In another possible implementation, the RRC request message includes the dedicatedNAS-message, the dedicatedNAS-message includes the LPP PDU, and the LPP PDU includes the LPP message.

In another possible implementation, the RRC request message further includes a cause value, the cause value indicates that the RRC request message is used for reporting any one of the following information: the LPP message, a NAS message, or positioning information of the terminal device, and the NAS message includes the LPP message.

In another possible implementation, the RRC request message further includes a routing identifier, and the routing identifier identifies a positioning device.

In another possible implementation, the sending unit is specifically configured to:

send an initial UE message to the core network device, where the initial UE message includes the LPP message; or send an NG uplink non-access stratum transport message to the core network device, where the NG uplink non-access stratum transport message includes the LPP message.

In another possible implementation, the initial UE message includes a NAS PDU, the NAS PDU includes a second LPP PDU, and the second LPP PDU includes the LPP message.

In another possible implementation, the NG uplink non-access stratum transport message includes a NAS PDU, the NAS PDU includes a second LPP PDU, and the second LPP PDU includes the LPP message.

A fourteenth aspect of embodiments of this application provides a communication apparatus, where the communication apparatus includes:

a receiving unit, configured to receive an initial UE message from an access network device, where the initial UE message includes an LPP message, and the LPP message is from a terminal device; and a sending unit, configured to send an NL1 protocol interface message to a positioning device, where the NL1 protocol interface message includes the LPP message.

In a possible implementation, the LPP message is carried in an LPP PDU in the initial UE message.

In another possible implementation, the initial UE message includes a NAS PDU, the NAS PDU includes a second LPP PDU, and the second LPP PDU includes the LPP message.

In another possible implementation, the initial UE message further includes a routing identifier. The communication apparatus further includes a processing unit, and the processing unit is configured to determine the positioning device corresponding to the routing identifier included in the initial UE message.

In another possible implementation, the NL1 protocol interface message includes a third LPP PDU, and the third LPP PDU includes the LPP message.

In another possible implementation, the NL1 protocol interface message is an access and mobility management function AMF communication N1 message notify message or an AMF communication non-user N2 information notify message.

A fifteenth aspect of embodiments of this application provides a communication apparatus, where the communication apparatus includes:

a receiving unit, configured to receive a request location information message from a positioning device, where the request location information message includes information indicating the communication apparatus in a non-connected state to report positioning information of the communication apparatus to the positioning device, or includes information indicating the communication apparatus to report positioning information of the communication apparatus to the positioning device on a preconfigured uplink resource; and a sending unit, configured to send a request message to an access network device based on the request location information message, where the request message is for requesting the preconfigured uplink resource.

The receiving unit is further configured to receive an RRC release message from the access network device, where the RRC release message includes configuration information of the preconfigured uplink resource allocated by the access network device to the communication apparatus.

In a possible implementation, the communication apparatus further includes a processing unit.

The processing unit is configured to determine an uplink resource based on the configuration information of the preconfigured uplink resource.

The sending unit is further configured to:

send an RRC request message to the access network device on the uplink resource, where the RRC request message includes an LPP message, and the LPP message is from the communication apparatus.

In another possible implementation, the sending unit is further configured to:

send capability information of the communication apparatus to the positioning device, where the capability information indicates whether the communication apparatus supports a capability of reporting the positioning information of the communication apparatus to the positioning device on the preconfigured uplink resource.

In another possible implementation, the sending unit is specifically configured to:

send a provide capability message to the positioning device, where the provide capability message includes the capability information of the communication apparatus.

In another possible implementation, the LPP message is carried in an LPP PDU of the RRC request message.

In another possible implementation, the RRC request message includes a dedicatedNAS-message, the dedicated-NAS-message includes the LPP PDU, and the LPP PDU includes the LPP message.

In another possible implementation, the RRC request message further includes a cause value, the cause value indicates that the RRC request message is used for reporting any one of the following information: the LPP message, a NAS message, or the positioning information of the communication apparatus, and the NAS message includes the LPP message.

A sixteenth aspect of embodiments of this application provides a communication apparatus, where the communication apparatus includes:

a receiving unit, configured to receive an RRC request message from a terminal device, where the RRC request message includes an LPP message, and the LPP message is from the terminal device; and a sending unit, configured to send an initial UE message to a core network device, where the initial UE message includes the LPP message.

In another possible implementation, the LPP message is carried in a first LPP PDU of the RRC request message.

In another possible implementation, the RRC request message includes a dedicatedNAS-message, the dedicated-NAS-message includes the first LPP PDU, and the first LPP PDU includes the LPP message.

In another possible implementation, the RRC request message further includes a cause value, the cause value indicates that the RRC request message is used for reporting any one of the following information: the LPP message, a NAS message, or positioning information of the terminal device, and the NAS message includes the LPP message.

In another possible implementation, the initial UE message includes a NAS PDU, the NAS PDU includes a second LPP PDU, and the second LPP PDU includes the LPP message.

A seventeenth aspect of embodiments of this application provides a communication apparatus, where the communication apparatus includes a processor, a memory, and a transceiver connected to the processor. The memory stores a computer program or computer instructions, and the processor is further configured to invoke and run the computer program or the computer instructions stored in the memory, to enable the processor to implement any implementation of any one of the first aspect to the eighth aspect.

Optionally, the processor is configured to control the transceiver to perform any implementation of any one of the first aspect to the eighth aspect.

An eighteenth aspect of embodiments of this application provides a computer program product including computer instructions. When the computer program product runs on a computer, the computer is enabled to perform any implementation of any one of the first aspect to the eighth aspect.

A nineteenth aspect of embodiments of this application provides a computer-readable storage medium, including computer instructions. When the computer instructions are run on a computer, the computer is enabled to perform any implementation of any one of the first aspect to the eighth aspect.

A twentieth aspect of embodiments of this application provides a communication apparatus, where the communication apparatus includes an entity such as a network device, a terminal device, or a chip, and the communication apparatus includes a processor. The processor is configured to invoke a computer program or computer instructions in a memory, to enable the processor to perform any implementation of any one of the first aspect to the eighth aspect.

Optionally, the processor is coupled to the memory through an interface.

A twenty-first aspect of embodiments of this application provides a communication system, where the communication system includes the communication apparatus according to the tenth aspect and the communication apparatus according to the eleventh aspect, or the communication apparatus according to the thirteenth aspect and the communication apparatus according to the fourteenth aspect.

According to the foregoing technical solutions, it can be learned that embodiments of this application have the following advantages:

It can be learned from the foregoing technical solutions that, the terminal device sends the RRC resume request message to the access network device, and then the terminal device receives the RRC release message sent by the access network device, where the RRC release message includes the LPP message, and the LPP message is from the positioning device. It can be learned that, in embodiments of this application, the terminal device sends the RRC resume request message to the access network device. Therefore, it can be learned that there is no RRC connection between the terminal device and the access network device, that is, the terminal device is in the non-connected state. The access network device sends, to the terminal device via the RRC release message of the terminal device, the LPP message from the positioning device, so that the terminal device in the non-connected state obtains the LPP message of the positioning device, to position the terminal device. In other words, the terminal device does not need to access the network and enter the connected state before receiving the LPP message of the positioning device, to reduce the delay in delivering the LPP message by the positioning device. In addition, for the terminal device without the data service, the terminal device can obtain the LPP message in the non-connected state, to reduce the power consumption of the UE.

BRIEF DESCRIPTION OF THE DRAWINGS

FIG. 5B is a schematic diagram of another embodiment of a communication method according to embodiments of this application;

DETAILED DESCRIPTION OF ILLUSTRATIVE EMBODIMENTS

The following clearly and completely describes technical solutions in embodiments of this application with reference to the accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

The term "and/or" in this application describes only an association relationship for describing associated objects and indicates that three relationships may exist. For example, A and/or B may indicate the following three cases: Only A exists, both A and B exist, and only B exists. In addition, the character "/" in this application generally indicates an "or" relationship between the associated objects.

Figure 1:
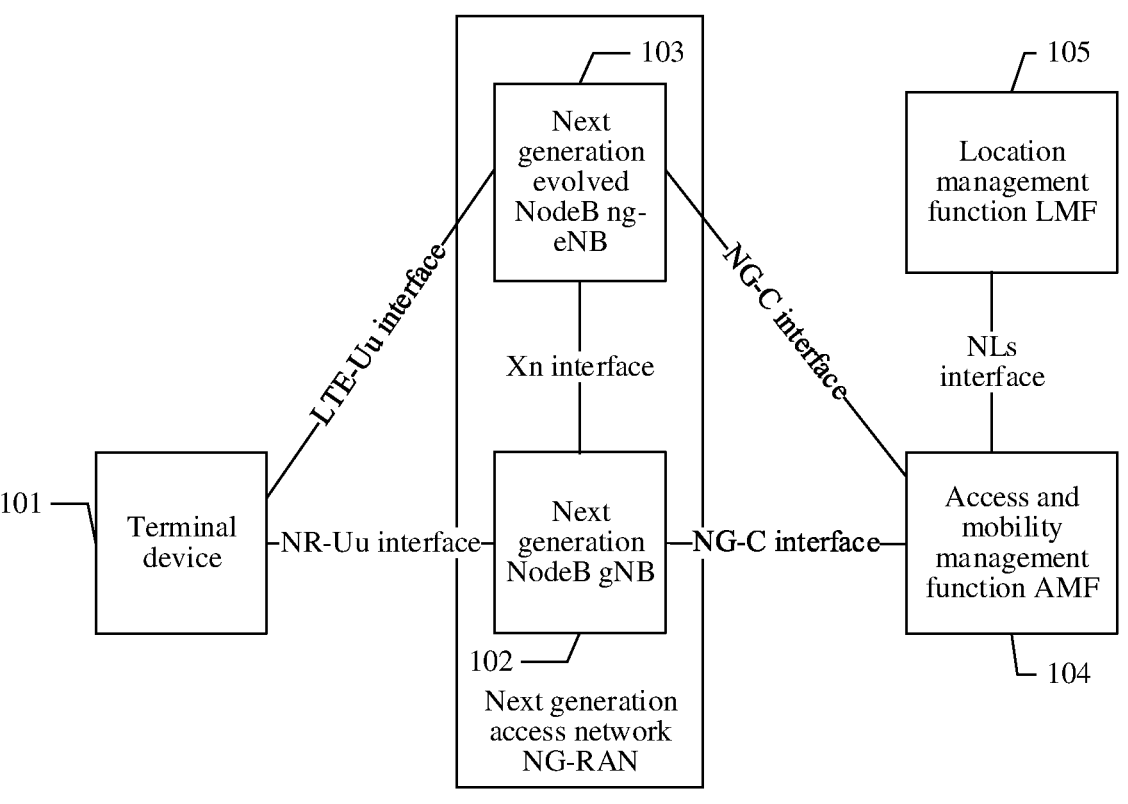
FIG. 1 is a schematic diagram of an architecture of a communication system according to an embodiment of this application.

FIG. 1 is a schematic diagram of an architecture of a communication system according to an embodiment of this application. The communication system includes a terminal device 101, a next generation NodeB (gNB) 102, a next generation evolved NodeB (ng-eNB) 103, an access and mobility management function (AMF) 104, and a location management function (LMF) device.

The terminal device 101 communicates with a serving base station through a Uu interface (as shown in FIG. 1, the terminal device 101 is connected to the gNB 102 through an NR-Uu interface, and is connected to the ng-eNB 103 through an LTE-Uu interface). The ng-eNB 103 is an evolved long term evolution (LTE) base station connected to a 5G core network, and the gNB 102 is a base station in a 5G communication system. In this network architecture, the base stations communicate with each other through an Xn interface, and the base station communicates with the AMF 104 through an NG-C interface. The AMF 104 communicates with the LMF 105 through an NL1 interface, and the AMF 104 is equivalent to a router for communication between the base station and the LMF 105. The LMF 105 is configured to perform positioning calculation and management on a location of the terminal device.

FIG. 1 shows only an example in which the communication system includes two base stations: the gNB and the ng-eNB. In actual application the communication system may alternatively include more base stations, or the communication includes only one base station. This is not specifically limited in this application.

The following describes an access network device and the terminal device in the communication system provided in this embodiment of this application.

The ng-eNB and the gNB are access network devices in an access network. The access network device is an apparatus that is deployed in a radio access network and that provides a wireless communication function for the terminal device. The access network device is a base station, and the base station is a macro base station, a micro base station (also referred to as a small cell), a relay station, an access point (AP), a wearable device, a vehicle-mounted device, or the like in various forms. The base station may alternatively be a transmission reception point (TRP), a transmission measurement function (TMF), or the like. For example, the base station in embodiments of this application may be a base station in new radio (NR). The base station in 5G NR may alternatively be referred to as a transmission reception point (TRP) or a transmission point (TP) or the next generation NodeB (ngNB) shown in FIG. 1, or may be the evolved NodeB (eNB or eNodeB) in the long term evolution (LTE) system shown in FIG. 1.

The terminal device is also referred to as user equipment (user equipment, UE), a mobile station (MS), a mobile terminal (MT), or the like, and is a device that includes a wireless communication function (provides voice/data connectivity to a user), for example, a handheld device or a vehicle-mounted device having a wireless connection function. Currently, some examples of the terminal device are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid (smart grid), a wireless terminal in transportation safety, a wireless terminal in smart city, or a wireless terminal in smart home.

In this embodiment of this application, the core network device is a control plane network function provided by a network, and is responsible for access control, registration management, service management, mobility management, and the like for accessing a network by the terminal device. In this embodiment of this application, the core network device may be an access and mobility management function (AMF) in the 5G communication system, a core network device in a future network, or the like. A specific type of the core network device is not limited in this application. In different communication systems, names of core network devices may be different.

In this embodiment of this application, in the communication system shown in FIG. 1, the LMF device is a name in an existing communication system. In a future communication system, the name of the LMF device may change with evolution of the communication system. Therefore, the LMF device is referred to as a positioning device below to describe embodiments of this application. The positioning device is configured to perform positioning calculation on the location of the terminal device. In the existing communication system or the future communication system, a functional network element of another name having a function similar to that of the positioning device may be understood as the positioning device in embodiments of this application, and is applicable to a communication method provided in embodiments of this application.

In the following embodiments of this application, the technical solution provided in this application is applied to a communication system in which an LPP is used between the terminal device and the positioning device. In actual application, the technical solution in embodiments of this application is also applicable to a communication system in which another positioning protocol is used between the terminal device and the positioning device. This is not specifically limited in this application.

Currently, a positioning device sends an LPP message to a terminal device in a connected state, to position the terminal device. However, when the terminal device is in a non-connected state, the terminal device first initiates access to a network and enters the connected state, and then the positioning device sends the LPP message to the terminal device. In other words, currently, the terminal device can obtain the LPP message of the positioning device only when the terminal device is in the connected state. As a result, for a terminal device without a data service, keeping the connected state causes a heavy energy waste and large energy consumption of the terminal device. In addition, corresponding time is required for a process in which the terminal device initiates access to the network and enters the connected state. Consequently, a delay in sending the LPP message by the positioning device to the terminal device is long, and an extra delay is caused by positioning of the terminal device.

In view of this, an embodiment of this application provides a communication method, so that a terminal device in a non-connected state obtains an LPP message of a positioning device, to position the terminal device. For details, refer to related descriptions of the embodiments shown in FIG. 2 and FIG. 3.

Figure 2A:
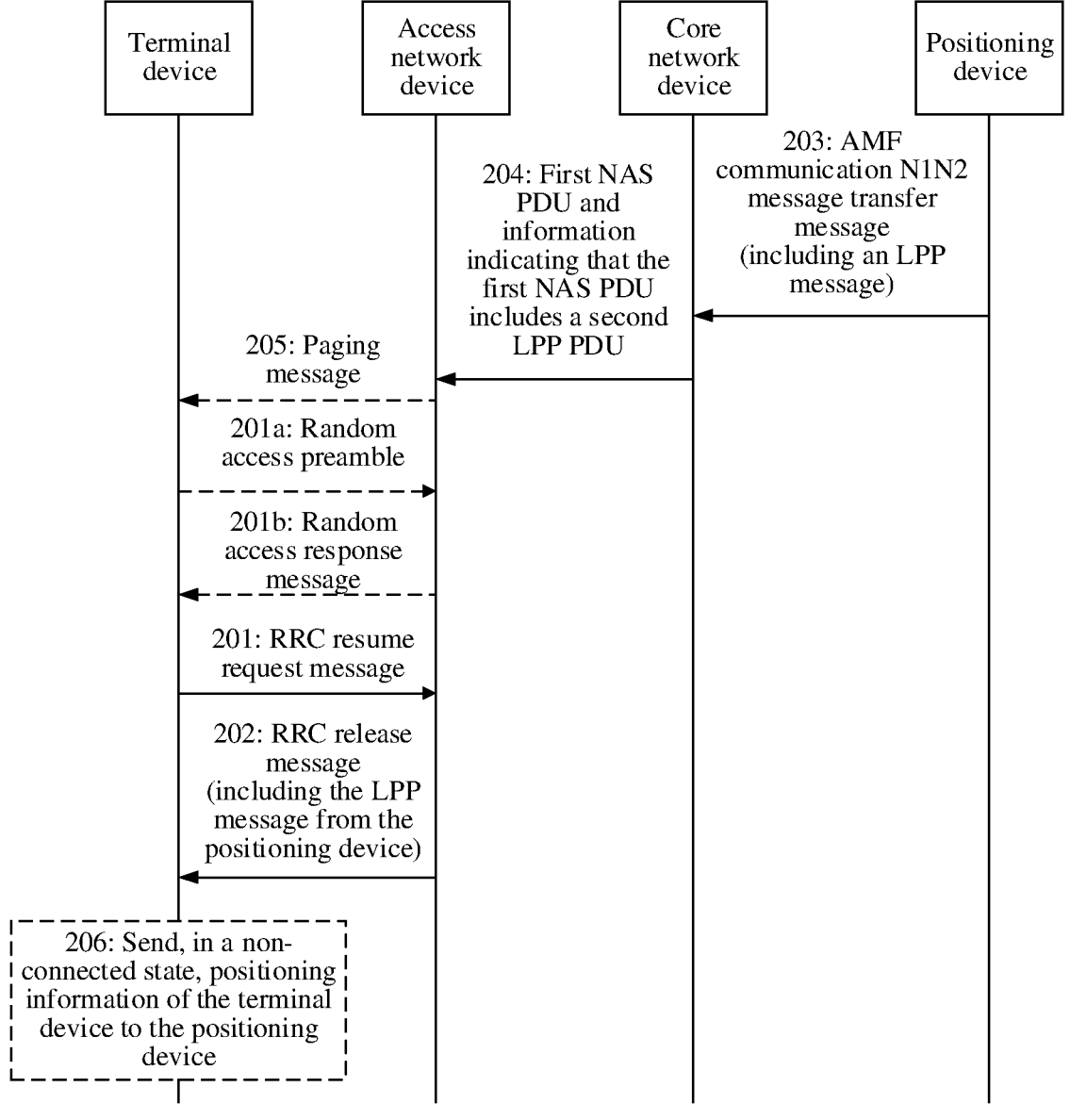
FIG. 2A is a schematic diagram of an embodiment of a communication method according to embodiments of this application.

FIG. 2A is a schematic diagram of an embodiment of a communication method according to embodiments of this application. In FIG. 2A, the communication method includes the following steps.

201: A terminal device sends an RRC resume request message to an access network device. Accordingly, the access network device receives the RRC resume request message from the terminal device.

The terminal device is in an inactive state, and the access network device may be a last serving access network device (last serving RAN) of the terminal device. The last serving access network device reserves a context of the terminal device and an NG connection that is associated with the terminal device and that is between the terminal device and a serving AMF.

Before step 201, this embodiment may further include step 201a and step 201b, and step 201a and step 201b are performed before step 201.

201a: The terminal device sends a random access preamble to the access network device. Accordingly, the access network device receives the random access preamble from the terminal device.

201b: The access network device sends a random access response message to the terminal device. Accordingly, the terminal device receives the random access response message from the access network device.

202: The access network device sends an RRC release message to the terminal device. Accordingly, the terminal device receives the RRC release message from the access network device.

The RRC release message includes an LLP message, and the LLP message is from a positioning device. In other words, the LLP message is an LLP message sent by the positioning device to the terminal device. The positioning device may be an LMF device.

Specifically, the terminal device initiates an RRC resume request to the access network device, and the access network device may reject the RRC resume request of the terminal device. Then, the access network device sends the RRC release message to the terminal device, so that the terminal device keeps in a non-connected state. In addition, the RRC release message includes the LLP message, so that when the terminal device is in the non-connected state, the access network device sends, to the terminal device, the LPP message from the positioning device.

The LPP message may be any LPP protocol interface message. For example, the LPP message is any one of the following: a request location information message, a request capability message, and a provide or assistance data message.

Optionally, the LLP message is carried in a first LPP PDU of the RRC release message. Specifically, the RRC release message includes a dedicated non-access stratum message (dedicatedNAS-message) information element, the dedicatedNAS-message includes the first LPP PDU, and the first LPP PDU includes the LPP message. For example, the first LPP PDU is the LPP message, or the first LPP PDU includes the LPP message, and further includes other content.

The foregoing shows an example in which the first LPP PDU is carried in the dedicatedNAS-message of the RRC release message. In actual application, the first LPP PDU may alternatively be carried in another information element of the RRC release message. This is not specifically limited in this application.

Optionally, the RRC release message further includes a routing identifier (ID), and the routing identifier identifies the positioning device.

Specifically, the dedicatedNAS-message of the RRC release message includes the routing identifier. The routing identifier is allocated by a core network device (for example, an AMF) in a core network, and is used by the core network device to identify the positioning device. In this way, when the terminal device reports the LPP message to the positioning device through the core network device, the terminal device may include the routing identifier in a bearer message that carries the LPP message. In this way, the core network device can use the routing identifier carried in the bearer message that carries the LPP message, to identify the positioning device corresponding to the routing identifier, and send the LPP message of the terminal device to the positioning device.

In this embodiment, before step 202, the access network device obtains the LPP message from the positioning device. A specific obtaining process is described below by using step 203 and step 204.

203: The positioning device sends an AMF communication N1N2 message transfer message (Namf_Communication N1N2MessageTransfer) to the core network device, where the AMF communication N1N2 message transfer message includes the LPP message. Accordingly, the core network device receives the AMF communication N1N2 message transfer message from the positioning device.

The LPP message is from the positioning device, in other words, the LPP message is an LPP message sent by the positioning device to the terminal device.

Optionally, the LPP message is carried in a fourth LPP PDU of the AMF communication N1N2 message transfer message.

Specifically, the positioning device sends the AMF communication N1N2 message transfer message to the core network device, where the AMF communication N1N2 message transfer message includes the fourth LPP PDU, and the fourth LPP PDU includes the LLP message. For example, the fourth LPP PDU is an LPP message from the positioning device.

204: The core network device sends, to the access network device, a first NAS PDU and information indicating that the first NAS PDU includes a second LPP PDU. Accordingly, the access network device receives, from the core network device, the first NAS PDU and the information indicating indicate that the first NAS PDU includes the second LPP PDU.

The first NAS PDU includes the second LPP PDU, and the second LPP PDU includes the LPP message.

Specifically, when the terminal device is in the inactive state, the core network device may send an NG downlink non-access stratum transport (NGAP downlink nas transport) message to the access network device (for example, a last serving access network device (last serving RAN)). The NG downlink non-access stratum transport message includes the first NAS PDU, the first NAS PDU includes the second LPP PDU, and the second LPP PDU includes the LLP message. For example, the second LPP PDU is an LPP message from the positioning device. Accordingly, the access network device receives the NG downlink non-access stratum transport message from the core network device. In addition, the NG downlink non-access stratum transport message further includes information indicating that the first NAS PDU includes the second LPP PDU, to indicate the access network device to send, to the terminal device, the LLP message included in the second LPP PDU.

The information indicating that the first NAS PDU includes the second LPP PDU is indication information or information of another type. This is not specifically limited in this application.

Step 204 shows a carrying manner in which the second LPP PDU is carried in the first NAS PDU of the NG downlink non-access stratum transport message. In actual application, the second LPP PDU may alternatively be carried in another information element of the NG downlink non-access stratum transport message. This is not specifically limited in this application.

The AMF communication N1N2 message transfer message shown in step 203 is merely an example. In actual application, the positioning device may alternatively send the LPP message via another message in step 203. The NG downlink non-access stratum transport message shown in step 204 is merely an example. In actual application, the core network device may alternatively send the LPP message via another message in step 204. This is not specifically limited in this application.

It should be noted that step 201 and steps 203 to 204 are not subject to a fixed execution sequence. Step 201 may be performed before steps 203 to 204; or steps 203 to 204 may be performed before step 201. This is not specifically limited in this application.

If steps 203 to 204 are performed before step 201, optionally, this embodiment further includes step 205, and step 205 is performed after step 204.

205: The access network device sends a paging message to the terminal device. Accordingly, the terminal device receives the paging message from the access network device.

Specifically, after the access network device receives the second LPP PDU from the core network device in step 204, if the access network device determines that the terminal device is in the inactive state, the access network device initiates paging to the terminal device, to indicate the terminal device to access a network.

It may be understood that when steps 203 to 204 are performed before step 201, steps 201 to 202 may be considered as that the terminal device initiates the RRC resume request to receive the LPP message from the positioning device. When steps 203 to 204 are performed after step 201, steps 201 to 202 may be considered as that the terminal device initiates the RRC resume request for other transmission of the terminal device.

In this embodiment, in a possible implementation, in the foregoing step 202, the LPP message from the positioning device further includes information indicating the terminal device in the non-connected state to report positioning information of the terminal device to the positioning device.

The non-connected state includes an idle state or an inactive state.

The information indicating the terminal device in the non-connected state to report the positioning information of the terminal device to the positioning device may be indication information or information of another type. This is not specifically limited in this application. The indication information is the information indicating the terminal device in the non-connected state to report the positioning information of the terminal device to the positioning device.

For example, the LPP message includes the request location information message, the request location information message includes indication information, and the indication information is the information indicating the terminal device in the non-connected state to report the positioning information of the terminal device to the positioning device.

In this implementation, optionally, this embodiment further includes step 206, and step 206 is performed after step 202.

206: The terminal device in the non-connected state sends the positioning information of the terminal device to the positioning device.

For example, the positioning information of the terminal device may include at least one of the following: a measurement result of a positioning reference signal (PRS) measured by the terminal device, capability information of the terminal device, or information used by the terminal device to request assistance information from the positioning device.

Specifically, after the terminal device receives the information that is included in the LPP message from the positioning device in step 202 and that indicates the terminal device in the non-connected state to send the positioning information of the terminal device to the positioning device, after the terminal device is released to the non-connected state, the terminal device in the non-connected state sends the positioning information of the terminal device to the positioning device.

For example, the LPP message from the positioning device in step 202 is the request provide location information message, and the provide location information message includes indication information indicating the terminal device in the non-connected state to send, to the positioning device, the measurement result of the PRS measured by the terminal device. After the terminal device is released to the non-connected state, the terminal device continues to measure the PRS. Then, the terminal device may send, to the positioning device via the LPP message, the measurement result of the PRS measured by the terminal device. For example, the terminal device may send, to the positioning device via a provide location information message, the measurement result of the PRS measured by the terminal device, in other words, the provide location information message includes the measurement result of the PRS measured by the terminal device.

For a related execution process of step 206, refer to the following related descriptions in FIG. 4A, FIG. 5A, FIG. 6, and FIG. 7.

This application further provides an embodiment. This embodiment is similar to the embodiment shown in FIG. 2A, and a difference lies in step 202 in FIG. 2A. Step 202 is replaced with a step in which the access network device sends an RRC resume message to the terminal device. Accordingly, the terminal device receives the RRC resume message from the access network device.

The RRC resume message includes an LPP message, and the LPP message is from a positioning device, in other words, the LPP message is an LPP message sent by the positioning device to the terminal device.

Specifically, the terminal device initiates an RRC resume request to the access network device, and the access network device may accept the RRC resume request of the terminal device. Then, the access network device sends the RRC resume message to the terminal device, so that the terminal device accesses a network and enters a connected state. In addition, the RRC resume message includes the LPP message.

A carrying manner in which the LPP message is carried in the RRC resume message is similar to a carrying manner in which the LPP message is carried in the RRC release message in step 202 in the embodiment shown in FIG. 2A. For details, refer to related descriptions of step 202 in the embodiment shown in FIG. 2A.

Optionally, the RRC resume message further includes a routing identifier and/or information indicating the terminal device in a non-connected state to report positioning information of the terminal device to the positioning device. For the routing identifier and the information indicating the terminal device in the non-connected state to report the positioning information of the terminal device to the positioning device, refer to related descriptions of step 202 in the embodiment shown in FIG. 2A. Details are not described herein again.

In this embodiment, the access network device accepts RRC resume request of the terminal device, so that terminal device enters the connected state. For example, when an RRC resume request process of the terminal device shown in FIG. 2A is considered as that the terminal device requests the RRC resume request for other transmission of the terminal device, the access network device may accept the RRC resume request of the terminal device, so that the terminal device performs other transmission. In addition, the access network device sends the LPP message to the terminal device via the RRC resume message, to quickly deliver, to the terminal device, the LPP message from the positioning device. This reduces a delay in sending the LPP message by the positioning device to the terminal device, and avoids an extra delay caused by positioning of the terminal device.

This application further provides an embodiment. This embodiment is similar to the embodiment shown in FIG. 2A. A difference lies in that the terminal device in this embodiment initiates random access to the access network device by using a two-step random access mechanism. For details, refer to FIG. 2B. A difference between the embodiment shown in FIG. 2B and the embodiment shown in FIG. 2A lies in step 201*a*, step 201*b*, and step 201.

In this embodiment, step 201*a* and step 201*b* are not performed, and step 201 is replaced with a step in which the terminal device sends a message A to the access network device. Accordingly, the access network device receives the message A from the terminal device. The message A is a message A in a two-step random access process. For example, the message A includes a random access preamble and a payload on a physical uplink shared channel (PUSCH).

Figure 3:
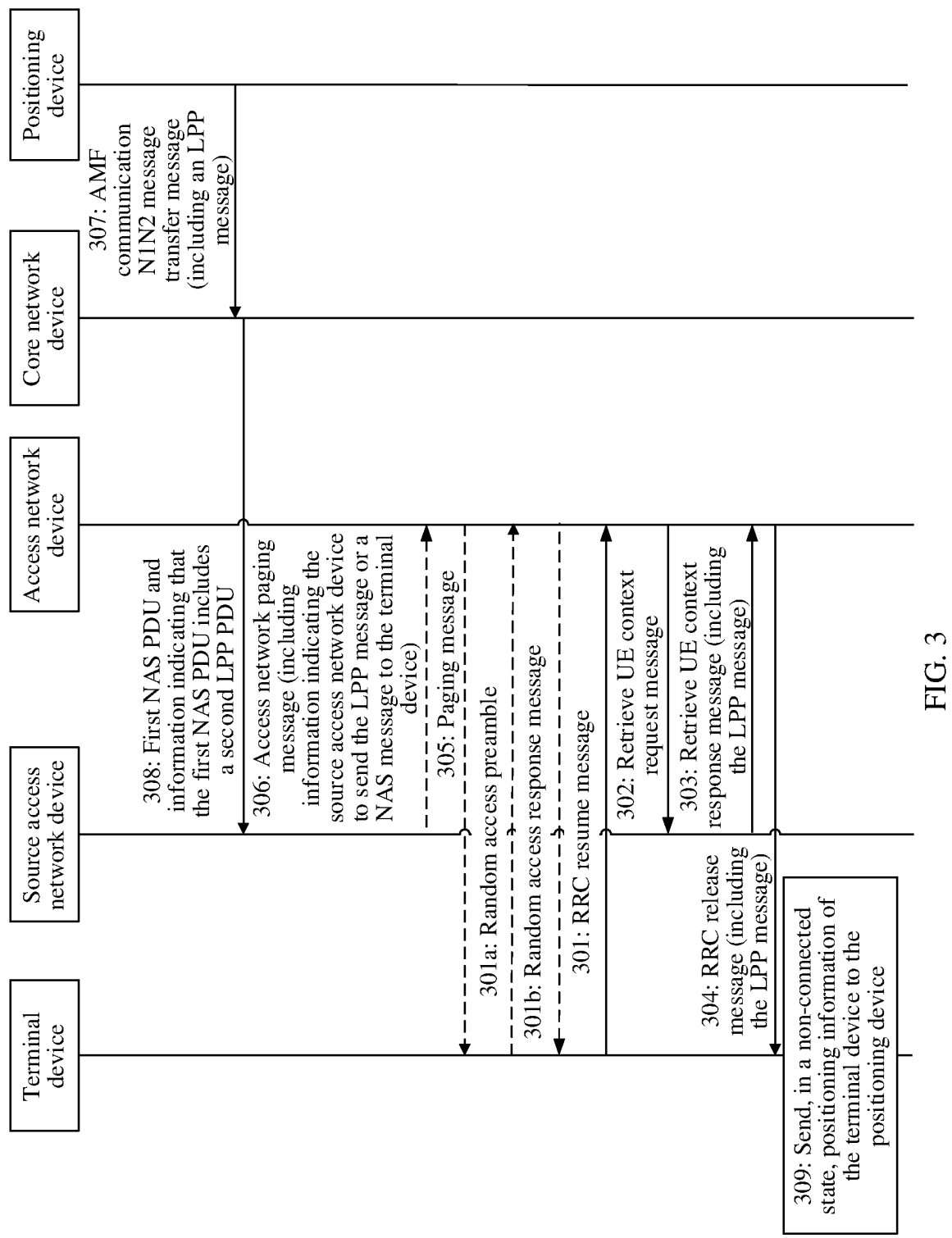
FIG. 3 is a schematic diagram of another embodiment of a communication method according to embodiments of this application.

With reference to an embodiment shown in FIG. 3, the following describes a process in which a terminal device obtains an LPP message from a positioning device when the terminal device in a non-connected state moves to a new access network device.

FIG. 3 is a schematic diagram of another embodiment of a communication method according to embodiments of this application. In FIG. 3, the communication method includes the following steps.

301: A terminal device sends an RRC resume request message to an access network device. Accordingly, the access network device receives the RRC resume message from the terminal device.

The terminal device moves to a coverage area of the access network device, and the terminal device is in an inactive state.

In this embodiment, the terminal device uses an access mechanism of four-step random access. Before step 301, the embodiment in FIG. 3 further includes step 301*a* and step 301*b*. Step 301*a* and step 301*b* are similar to step 201*a* and step 201*b* shown in FIG. 2A, and details are not described herein again.

Optionally, this embodiment further includes step 305, and step 305 is performed before step 301.

305: The access network device sends a paging message to the terminal device.

The paging message indicates the terminal device to initiate random access and an RRC resume request to the access network device.

Specifically, the terminal device moves to the coverage area of the access network device, in other words, the terminal device camps on the access network device. The access network device may be referred to as a camped access network device (camped RAN). In this case, the access network device may page the terminal device, to indicate the terminal device to initiate the random access and the RRC resume request to the access network device, so as to access a network.

302: The access network device sends a retrieve UE context request message to a source access network device. Accordingly, the source access network device receives the retrieve UE context request message from the access network device.

The source access network device is a base station that serves the terminal device before the terminal device moves to the access network device. For example, the source access network device may be a last serving access network device (last serving RAN) of the terminal device. For the last serving access network device, refer to related descriptions of step 201 in FIG. 2A.

Optionally, this embodiment further includes step 306, and step 306 is performed before step 305.

306: The source access network device sends an access network paging (RAN paging) message to the access network device.

Optionally, the access network paging message includes information indicating to the access network device that the paging message is used by the source access network device to send an LPP message or a NAS message to the terminal device. The NAS message includes the LPP message.

The information indicating to the access network device that the paging message is used by the source access network device to send the LPP message or the NAS message to the terminal device is indication information or information of another type. This is not specifically limited in this application.

Specifically, the source access network device may include the indication information in the access network paging message, to indicate to the access network device that the source access network device initiates access network paging to send the LPP message or the NAS message to the terminal device.

303: The source access network device sends a retrieve UE context response message to the access network device. Accordingly, the access network device receives the retrieve UE context response message from the source access network device.

The retrieve UE context response message includes the LPP message, and the LPP message is from a positioning device. In other words, the LPP message is an LPP message sent by the positioning device to the terminal device. Content of the LPP message is similar to content of the LPP message in step 202 in the embodiment shown in FIG. 2A. For details, refer to related descriptions of step 202 in the embodiment shown in FIG. 2A. Details are not described herein again.

Optionally, the LPP message is carried in a third LPP PDU in the retrieve UE context response message.

Specifically, the retrieve UE context response message includes a second NAS PDU, the second NAS PDU includes the third LPP PDU, and the third LPP PDU includes the LPP message. For example, the third LPP PDU is the LPP message, or the third LPP PDU includes the LPP message, and further includes other content.

The foregoing shows a carrying manner in which the third LPP PDU is carried in the second NAS PDU of the retrieve UE context response message. In actual application, the third LPP PDU may alternatively be carried in another information element of the retrieve UE context response message. This is not specifically limited in this application.

Optionally, the retrieve UE context response message further includes information indicating the source access network device to send the LPP message or the NAS message to the terminal device; or the retrieve UE context response message further includes information indicating that the second NAS PDU includes the third LPP PDU.

The NAS message includes the LPP message from the positioning device. The information indicating the source access network device to send the LPP message or the NAS message to the terminal device may be indication information or information of another type. This is not specifically limited in this application.

The information indicating that the second NAS PDU includes the third LPP PDU is indication information or information of another type. This is not specifically limited in this application.

It can be learned that the source access network device indicates, by using the information that indicates the source access network device to send the LPP message or the NAS message to the terminal device and that is included in the retrieve UE context response message or the information that indicates that the second NAS PDU includes the third LPP PDU and that is included in the retrieve UE context response message, that the retrieve UE context response message carries the LPP message. In this way, the access network device can determine that the retrieve UE context response message carries the LPP message, and send the LPP message to the terminal device via an RRC release message in step 304.

In this embodiment, the source access network device obtains the LPP message. The following provides descriptions with reference to step 307 and step 308.

307: The positioning device sends an AMF communication N1N2 message transfer message to a core network device, where the AMF communication N1N2 message transfer message includes the LPP message. Accordingly, the core network device receives the AMF communication N1N2 message transfer message from the positioning device.

308: The core network device sends, to the access network device, a first NAS PDU and information indicating that the first NAS PDU includes a second LPP PDU. Accordingly, the access network device receives, from the core network device, the first NAS PDU and the information indicating indicate that the first NAS PDU includes the second LPP PDU.

Steps 307 to 308 are similar to steps 203 to 204 in the embodiment shown in FIG. 2A. For details, refer to related descriptions of steps 203 to 204 in the embodiment shown in FIG. 2A. Details are not described herein again.

304: The access network device sends the RRC release message to the terminal device. Accordingly, the terminal device receives the RRC release message from the access network device.

Optionally, this embodiment further includes step 309, and step 309 is performed after step 304.

309: The terminal device in a non-connected state sends positioning information of the terminal device to the positioning device.

Step 304 is similar to step 202 in the embodiment shown in FIG. 2A, and step 309 is similar to step 206 in the embodiment shown in FIG. 2A. For details, refer to related descriptions of step 202 and step 206 in the embodiment shown in FIG. 2A. Details are not described herein again.

In the embodiments shown in FIG. 2A and FIG. 3, the terminal device sends the RRC resume request message to the access network device. Then, the terminal device receives the RRC release message sent by the access network device, where the RRC release message includes the LPP message, and the LPP message is from the positioning device. It can be learned that, in this embodiment of this application, when the terminal device is in the non-connected state, the access network device sends, to the terminal device via the RRC release message of the terminal device, the LPP message from the positioning device, so that the terminal device in the non-connected state obtains the LPP message of the positioning device, to position the terminal device. The terminal device does not need to initiate access and enter a connected state before receiving the LPP message from the positioning device, so that the terminal device can obtain the LPP message from the positioning device earlier, to reduce a delay in sending the LPP message by the positioning device to the terminal device, and avoid an extra delay caused by positioning of the terminal device. In addition, the terminal device may obtain the LPP message in the non-connected state. For a terminal device without a data service, the terminal device keeps in the non-connected state, to reduce power consumption of the terminal device.

This application further provides an embodiment. This embodiment is similar to the embodiment shown in FIG. 3, and a difference lies in step 304 in FIG. 3. Step 304 is replaced with a step in which the access network device sends an RRC resume message to the terminal device. Accordingly, the terminal device receives the RRC resume message from the access network device.

The RRC resume message includes the LPP message, and the LPP message is an LPP message sent by the positioning device to the terminal device.

Specifically, the terminal device initiates an RRC resume request to the access network device, and the access network device may accept the RRC resume request of the terminal device. Then, the access network device sends the RRC resume message to the terminal device, so that the terminal device accesses a network and enters a connected state. In addition, the RRC resume message includes the LPP message.

A carrying manner in which the LPP message is carried in the RRC resume message is similar to a carrying manner in which the LPP message is carried in the RRC release message in step 202 in the embodiment shown in FIG. 2A. For details, refer to related descriptions of step 202 in the embodiment shown in FIG. 2A.

Optionally, the RRC resume message further includes a routing identifier and/or information indicating the terminal device in a non-connected state to report positioning information of the terminal device to the positioning device. For the routing identifier and the information indicating the terminal device in the non-connected state to report the positioning information of the terminal device to the positioning device, refer to related descriptions of step 202 in the embodiment shown in FIG. 2A. Details are not described herein again.

In this embodiment, the access network device accepts the RRC resume request of the terminal device, so that the terminal device enters the connected state. For example, when an RRC resume request process of the terminal device shown in FIG. 3 is considered as that the terminal device requests the RRC resume request for other transmission of the terminal device, the access network device may accept the RRC resume request of the terminal device, so that the terminal device performs other transmission. In addition, the access network device sends the LPP message to the terminal device via the RRC resume message, to quickly deliver, to the terminal device, the LPP message from the positioning device. This reduces a delay in sending the LPP message by the positioning device to the terminal device, and avoids an extra delay caused by positioning of the terminal device.

This application further provides an embodiment. The terminal device initiates random access to the access network device by using a two-step random access mechanism. A difference between this embodiment and the embodiment shown in FIG. 3 lies in step 301a, step 301b, and step 301.

In this embodiment, step 301a and step 301b are not performed, and step 301 is replaced with a step in which the terminal device sends a message A to the access network device. Accordingly, the access network device receives the message A from the terminal device. The message A is a message A in a two-step random access process. For related descriptions of the message A, refer to related descriptions in the embodiment shown in FIG. 2B.

Currently, a process in which a terminal device reports an LPP message to a positioning device is as follows: The terminal device first accesses a network, so that the terminal device enters a connected state; and then the terminal device reports the LPP message to the positioning device, so that the positioning device positions the terminal device.

Therefore, it can be learned that when the terminal device reports the LPP message to the positioning device, the terminal device in the connected state can report the LPP message to the positioning device. Consequently, for a terminal device without a data service, keeping the connected state causes a heavy energy waste and large energy consumption of the terminal device. In addition, corresponding time is required for a process in which the terminal device initiates access to the network and enters the connected state. Consequently, a delay in sending the LPP message by the terminal device to the positioning device is long, and an extra delay is caused by positioning of the terminal device.

In view of this, embodiments of this application provide a communication method. The communication method includes: An access network device receives an RRC request message from a terminal device, where the RRC request message includes an LPP message, the LPP message is from the terminal device, and the terminal device is in a non-connected state; and then the access network device sends the LPP message to a core network device, and sends an RRC release message to the terminal device, so that the terminal device in the non-connected state reports the LPP message to the positioning device.

The foregoing technical solution may be performed in any one of the following processes of the terminal device.

1. RRC Setup Request Process of the Terminal Device

The foregoing technical solution is performed in the RRC setup request process of the terminal device, in other words, the RRC request message is an RRC setup request message. For a specific execution process, refer to related descriptions of the embodiment subsequently shown in FIG. 4A.

2. RRC Resume Request Process of the Terminal Device

The foregoing technical solution is performed in the RRC resume request process of the terminal device, in other words, the RRC request message is an RRC resume request message. For a specific execution process, refer to related descriptions of the embodiment subsequently shown in FIG. 5A.

3. RRC Data Request Process of the Terminal Device

The foregoing technical solution is performed in the RRC early data request process of the terminal device, in other words, the RRC request message is an RRC early data request message. For a specific execution process, refer to related descriptions of the embodiment subsequently shown in FIG. 6.

Figure 4A:
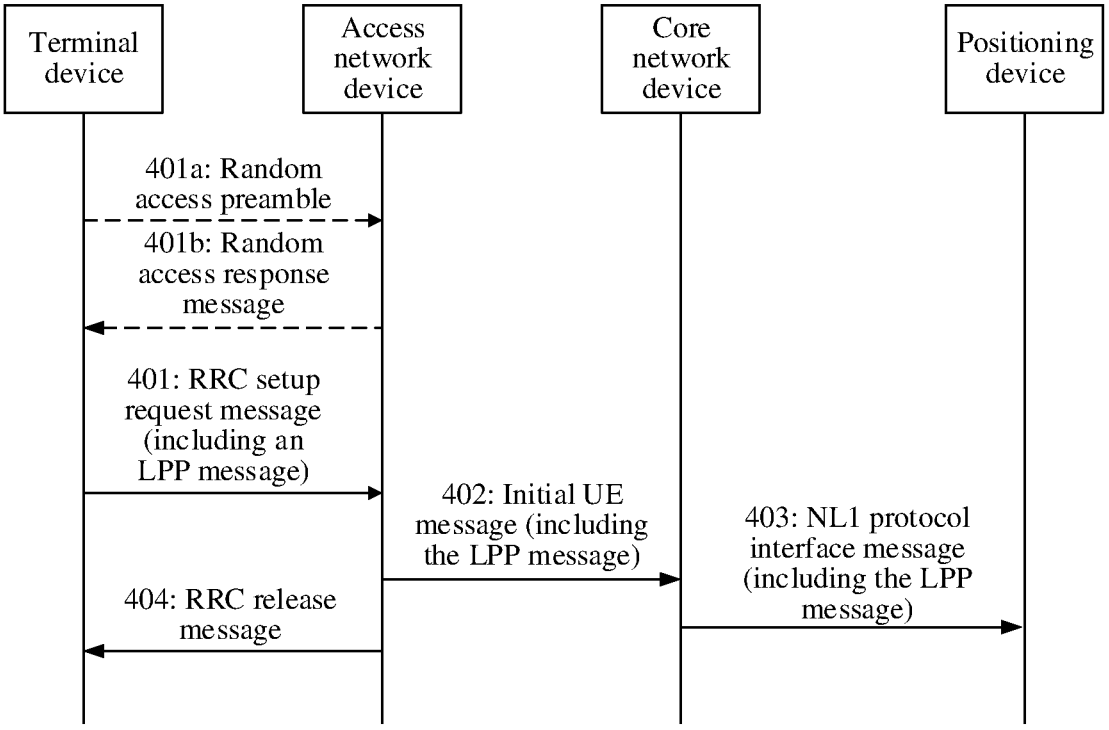
FIG. 4A is a schematic diagram of another embodiment of a communication method according to embodiments of this application.

FIG. 4A is a schematic diagram of an embodiment of a communication method according to embodiments of this application. In FIG. 4A, the communication method includes the following steps.

401: A terminal device sends an RRC setup request message to an access network device, where the RRC setup request message includes an LPP message. Accordingly, the access network device receives the RRC setup request message from the terminal device.

In this embodiment, the terminal device is in an idle state, and the RRC setup request message includes the LPP message from the terminal device, namely, the LPP message sent by the terminal device to a positioning device. The RRC setup request message is used by the terminal device to request to set up an RRC connection to the access network device.

The LPP message may be any LLP protocol interface message. For example, the LPP message is any one of the following: a provide location information message, a request assistance data message, and a provide capability (provide capabilities) message.

For example, in step 206 of the embodiment shown in FIG. 2A, after the terminal device receives the information that is included in the LPP message from the positioning device in step 202 of the embodiment shown in FIG. 2A and that indicates the terminal device in the non-connected state to send the positioning information of the terminal device to the positioning device, after the terminal device is released to the non-connected state, the terminal device in the non-connected state sends the positioning information of the terminal device to the positioning device. For example, the LPP message from the positioning device in step 202 of the embodiment shown in FIG. 2A is the request provide location information message, and the provide location information message includes indication information indicating the terminal device in the non-connected state to send, to the positioning device, the measurement result of the PRS measured by the terminal device. After the terminal device is released to the non-connected state, the terminal device may continue to measure the PRS. Then, the terminal device sends, to the positioning device via the LPP message, the measurement result of the PRS measured by the terminal device, in other words, the terminal device may send the provide location information message (namely, the LPP message of the terminal device) via the RRC setup request message in step 401, where the provide location information message includes the measurement result of the PRS measured by the terminal device.

Optionally, the LPP message is carried in a first LPP PDU of the RRC setup request message.

Specifically, the RRC setup request message includes a dedicatedNAS-message, the dedicatedNAS-message includes the first LPP PDU, and the first LPP PDU includes the LPP message. For example, the first LPP PDU is the LPP message.

The foregoing shows a carrying manner in which the first LPP PDU is carried in the dedicatedNAS-message of the RRC setup request message. In actual application, the first LPP PDU may alternatively be carried in another information element of the RRC setup request message. This is not specifically limited in this application.

In a possible implementation, the RRC setup request message further includes a routing identifier (ID), and the routing identifier identifies the positioning device. Specifically, the routing identifier is included in the dedicatedNAS-message. The routing identifier is allocated by a core network device (for example, an AMF) in a core network, and is used by the core network device to identify the positioning device. In this way, the core network device can use the routing identifier carried in the RRC setup request message, to determine the positioning device corresponding to the routing identifier, and then send, to the positioning device, the LPP message from the terminal device.

Optionally, the RRC setup request message further includes a cause value. The cause value indicates that the RRC setup request message is used for reporting any one of the following information: the LLP message, a NAS message, or the positioning information of the terminal device, and the NAS message includes the LPP message.

Specifically, the terminal device may include the cause value in an RRC setup request. For example, a name of the cause value is any one of the following: LPP, nas, positioning (Pos), LPP-data, nas-data, mobile originated data (mo-data), or positioning data (pos-data). The cause value indicates that the RRC setup request initiated by the terminal device is used for reporting any one of the following information: the LLP message, the NAS message, or the positioning information of the terminal device.

Before step 401, this embodiment further includes step 401a and step 401b, and step 401a and step 401b are performed before step 401.

401a: The terminal device sends a random access preamble to the access network device. Accordingly, the access network device receives the random access preamble from the terminal device.

401b: The access network device sends a random access response message to the terminal device. Accordingly, the terminal device receives the random access response message from the access network device.

402: The access network device sends an initial UE message to the core network device, where the initial UE message includes the LPP message. Accordingly, the core network device receives the initial UE message from the access network device.

The LLP message is carried in a first NAS PDU of the initial UE message.

Specifically, the initial UE message includes the first NAS PDU, the first NAS PDU includes a second LPP PDU, and the second LPP PDU includes the LPP message. For example, the second LPP PDU is the LPP message. In other words, the access network device sends the second LPP PDU to the core network device (for example, an AMF network element) via the first NAS PDU of the initial UE.

The foregoing shows a carrying manner in which the second LPP PDU is carried in the first NAS PDU of the initial UE message. In actual application, the second LPP PDU may alternatively be carried in another information element of the initial UE message. This is not specifically limited in this application.

403: The core network device sends an NL1 protocol interface message to the positioning device, where the NL1 protocol interface message includes the LPP message. Accordingly, the positioning device receives the NL1 protocol interface message from the core network device.

Specifically, the core network device receives the initial UE message sent by the access network device, determines the LPP message based on the initial UE message, and then sends the LPP message to the positioning device via the NL1 protocol interface message. An NL1 interface is an interface between the core network device and the positioning device.

Optionally, the initial UE message further includes the routing identifier. The core network device determines, based on the routing identifier, the positioning device corresponding to the routing identifier, and sends the LPP message to the positioning device via the NL1 protocol interface message.

In this embodiment, a specific form of the NL1 protocol interface message in step 403 needs to be determined depending on whether a NAS connection is set up between the core network device and the terminal device.

Case 1: The terminal device is in the idle state, and no NAS connection is set up between the core network device and the terminal device.

Figure 4B:
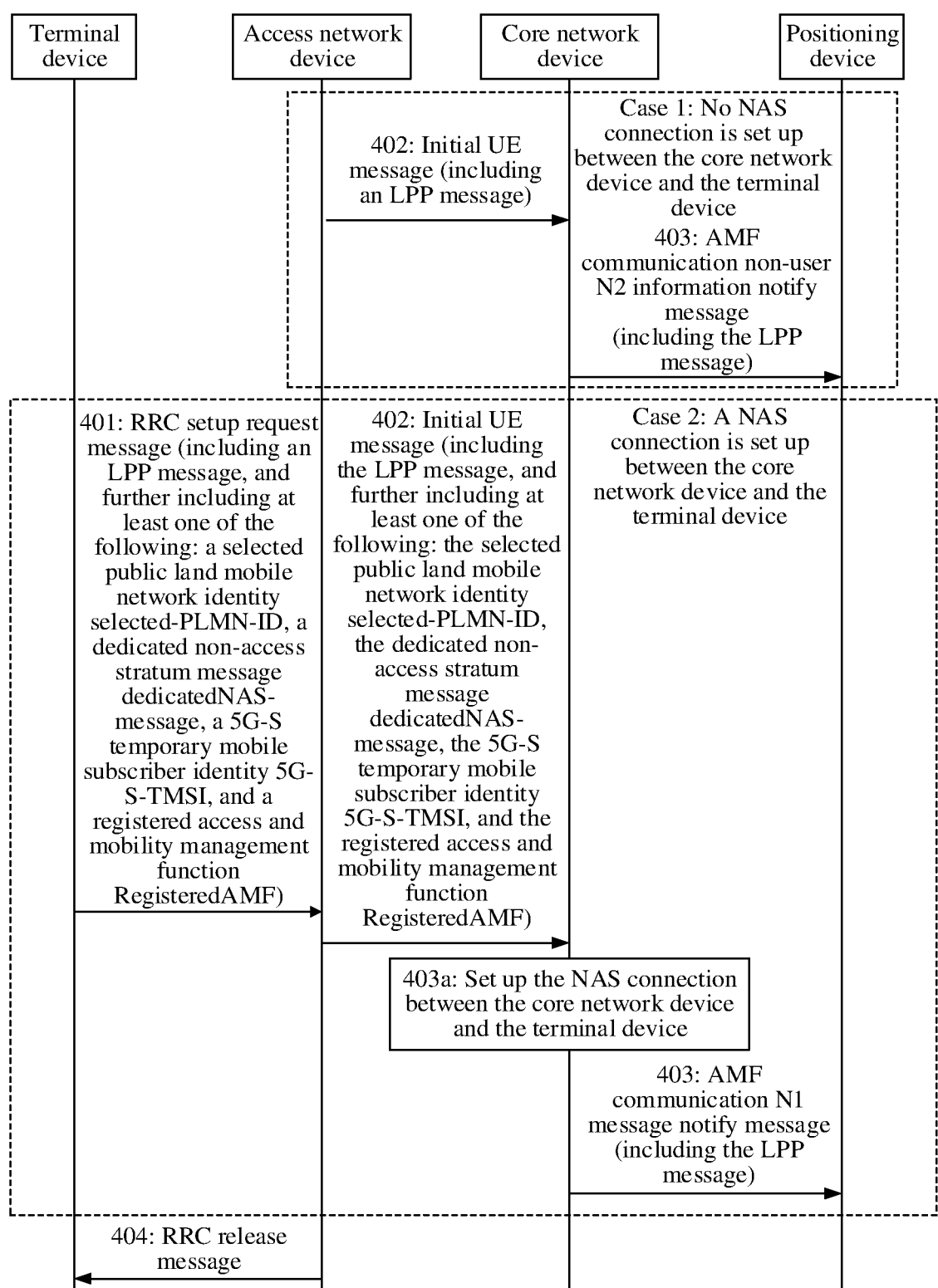
FIG. 4B is a schematic diagram of another embodiment of a communication method according to embodiments of this application.

The core network device includes the LPP message in an existing message or a newly added message, to send the LPP message to the positioning device. For example, as shown in FIG. 4B, step 403 is specifically as follows: The core network device sends an AMF communication non-user N2 information notify message (Namf_Communication_NonUeN2InforNotify) to the positioning device, where the AMF communication non-user N2 information notify message includes the LPP message. Accordingly, the positioning device receives the AMF communication non-user N2 information notify message from the core network device.

Optionally, the LPP message is carried in a third LPP PDU of the AMF communication non-user N2 information notify message.

Specifically, the core network device sends the AMF communication non-user N2 information notify message to the positioning device, where the AMF communication non-user N2 information notify message includes the third LPP PDU, and the third LPP PDU includes the LPP message. For example, the third LPP PDU is the LPP message.

Case 2: The NAS connection is set up between the core network device and the terminal device.

In case 2, as shown in FIG. 4B, the RRC setup request message in step 401 further includes at least one of the following: a selected public land mobile network identity (selected-PLMN-ID), an uplink transmission direct current list (UplinkTxDirectCurrentList), measurement result idle new radio (measResultIdleNR), a 5G-S temporary mobile subscriber identity (5G-S-TMSI), a registered access and mobility management function (RegisteredAMF), an access and mobility management function set identifier (AMF Set ID), and a dedicatedNAS-message.

In other words, it may be understood as that the RRC setup request message includes all or some of information elements of an RRC setup complete message in an existing process, to be used by the terminal device to request a network to set up the NAS connection between the terminal device and the core network device, or used by the terminal device to set up a signaling radio bearer 2 (SRB 2) for carrying a NAS message between the terminal device and the core network device, or used by the terminal device to request a network to set up an SRB 2 for carrying a NAS message between the terminal device and the core network device.

In this case, the access network device sends at least one of the following to the core network device via the initial UE message: the selected public land mobile network identity (selected-PLMN-ID), the uplink transmission direct current list (UplinkTxDirectCurrentList), the 5G-S-TMSI, the RegisteredAMF, and the AMF set ID. In this case, after the core network device receives the initial UE message, the core network device sets up the NAS connection between the core network device and the terminal device. For details, refer to the embodiment shown in FIG. 4B.

Therefore, this embodiment further includes step 403a, and step 403a is performed after step 402 and before step 403.

403a: The core network device sets up the NAS connection between the core network device and the terminal device.

Specifically, after the core network device receives the initial UE message, the core network device sets up the NAS connection between the core network device and the terminal device.

In this case, step 403 specifically includes: The core network device sends an AMF communication N1 message notify (Namf_Communication_N1MessageNotify) message to the positioning device.

The AMF communication N1 message notify message includes the LPP message.

Optionally, the LPP message is carried in a third LPP PDU of the AMF communication N1 message notify message.

Specifically, the AMF communication N1 message notify message includes the third LPP PDU, and the third LPP PDU includes the LPP message. For example, the third LPP PDU is the LPP message.

404: The access network device sends an RRC release message to the terminal device. Accordingly, the terminal device receives the RRC release message from the access network device.

After the access network device receives the RRC setup request message of the terminal device in step 401, the access network device determines to reject access of the terminal device. In this case, the access network device may send the RRC release message to the terminal device, so that the terminal device keeps in the non-connected state, and the terminal device in the non-connected state sends the LPP message to the positioning device.

It should be noted that step 404 is performed after step 401. Step 404 and steps 402 to 403 are not subject to a fixed execution sequence. Step 404 may be first performed, or steps 402 to 403 may be first performed, or step 404 and steps 402 to 403 are simultaneously performed based on a case. This is not specifically limited in this application.

In this embodiment of this application, the terminal device sends the RRC setup request message to the access network device, where the RRC setup request message includes the LPP message from the terminal device. Then, the access network device sends the initial UE message to the core network device, where the initial UE message includes the LPP message. Then, the core network device sends the LPP message to the positioning device. The access network device feeds back the RRC release message to the terminal device. It can be learned that, in this embodiment of this application, the terminal device in the idle state reports the LPP message to the positioning device via the RRC setup request message, so that the terminal device in the non-connected state reports the LPP message to the positioning device. The terminal device does not need to initiate access and enter a connected state before sending the LPP message of the terminal device to the positioning device, so that the terminal device can send the LPP message of the terminal device to the positioning device earlier, to reduce a delay in sending the LPP message by the terminal device to the positioning device, and avoid an extra delay caused by positioning of the terminal device by the positioning device. In addition, the terminal device may obtain the LPP message in the non-connected state. For a terminal device without a data service, the terminal device keeps in the non-connected state, to reduce power consumption of the UE.

This application further provides an embodiment. This embodiment is similar to the embodiment shown in FIG. 4A. For details, refer to the embodiment shown in FIG. 4C. In the embodiment shown in FIG. 4C, the terminal device requests to access a network through two-step random access.

Figure 4C:
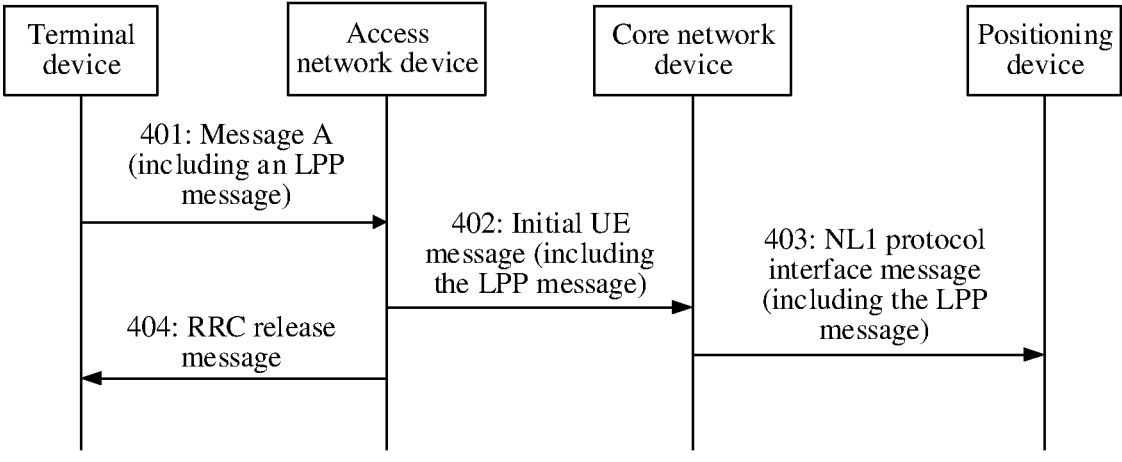
FIG. 4C is a schematic diagram of another embodiment of a communication method according to embodiments of this application.

A difference between the embodiment shown in FIG. 4C and the embodiment shown in FIG. 4A lies in step 401a, step 401b, and step 401 in the embodiment shown in FIG. 4A.

Step 401a and step 401b in the embodiment shown in FIG. 4A are not performed, and step 401 is replaced with step 401 in the embodiment shown in FIG. 4C, to be specific, the terminal device sends a message A to the access network device.

The message A is a message A in a two-step random access process, and the message A includes a random access preamble and a payload on a physical uplink shared channel. In this embodiment, the message A includes an LPP message, in other words, the LPP message is carried in the message A, and the LPP message is an LPP message sent by the terminal device to the positioning device.

Optionally, the LPP message is carried in an LPP PDU of the message A.

Specifically, the message A includes a dedicatedNAS-message, the dedicatedNAS-message of the message A includes the LPP PDU, and the LPP PDU includes the LPP message. For example, the LPP PDU is the LPP message.

The foregoing shows a carrying manner in which the LPP PDU is carried in the dedicatedNAS-message of the message A. In an actual application, the LPP PDU may alternatively be carried in another information element of the message A. This is not specifically limited in this application.

In a possible implementation, the message A further includes a routing identifier (ID), and the routing identifier identifies the positioning device. For example, the routing identifier is included in the dedicatedNAS-message of the message A.

Optionally, the message A further includes a cause value. The cause value indicates the terminal device to initiate access to the network, to report any one of the following information: the LLP message, a NAS message, or positioning information of the terminal device, where the NAS message includes the LPP message. For related descriptions of the cause value, refer to related descriptions of the embodiment shown in FIG. 4A. Details are not described herein again.

An embodiment of this application further provides an embodiment. This embodiment is similar to the embodiment shown in FIG. 4A, and a difference lies in step 404 in the embodiment shown in FIG. 4A.

Step 404 in the embodiment shown in FIG. 4A is replaced with a step in which the access network device sends an RRC setup message to the terminal device. Accordingly, the terminal device receives the RRC setup message from the access network device.

Specifically, the terminal device initiates an RRC setup request to the access network device, and the access network device may accept the RRC setup request of the terminal device. Then, the access network device sends the RRC setup message to the terminal device, so that the terminal device accesses a network and enters a connected state.

In this embodiment, the access network device accepts the RRC setup request of the terminal device, so that the terminal device enters the connected state. For example, when an RRC setup request process shown in FIG. 4A is used for other transmission of the terminal device, the access network device may accept the RRC setup request of the terminal device, so that the terminal device performs other transmission. It can be learned that, the terminal device in an idle state reports the LPP message to the positioning device via the RRC setup request message, so that the terminal device in the non-connected state reports the LPP message to the positioning device. The terminal device does not need to initiate access and enter the connected state before sending the LPP message of the terminal device to the positioning device, so that the terminal device can send the LPP message of the terminal device to the positioning device earlier, to reduce a delay in sending the LPP message by the terminal device to the positioning device, and avoid an extra delay caused by positioning of the terminal device by the positioning device.

An embodiment of this application further provides an embodiment. This embodiment is similar to the embodiment shown in FIG. 4C, and a difference lies in step 404 in the embodiment shown in FIG. 4C.

Step 404 in the embodiment shown in FIG. 4C is replaced with a step in which the access network device sends a message B (MsgB) to the terminal device. Accordingly, the terminal device receives the message B from the access network device, and the message B is a message B in a two-step random access mechanism. For example, the message B may be a response to a message A during two-step random access, and may include a response to contention resolution.

This application further provides an embodiment. This embodiment is similar to the embodiment shown in FIG. 4A, and a difference lies in step 401 in the embodiment shown in FIG. 4A.

Step 401 is replaced with a step in which the terminal device sends an RRC setup complete message to the access network device, where the RRC setup complete message includes an LPP message. Accordingly, the access network device receives the RRC setup complete message from the terminal device.

In this embodiment, the terminal device is in an idle state, and the RRC setup complete message includes the LPP message sent by the terminal device to the positioning device. Content of the LPP message is similar to content of the LPP message in step 401 in the embodiment shown in FIG. 4A. For details, refer to related descriptions of the LPP message in step 401 in the embodiment shown in FIG. 4A. If the RRC setup complete message includes the LPP message, an RRC setup request message does not include the LPP message.

Optionally, the LPP message is carried in an LPP PDU of the RRC setup complete message.

Specifically, the RRC setup complete message includes a dedicatedNAS-message, the dedicatedNAS-message of the RRC setup complete message includes the LPP PDU, and the LPP PDU includes the LPP message. For example, the LPP PDU is the LPP message.

The foregoing shows a carrying manner in which the LPP PDU is carried in the dedicatedNAS-message of the RRC setup complete message. In actual application, the LPP PDU may alternatively be carried in another information element of the RRC setup complete message. This is not specifically limited in this application.

In a possible implementation, the RRC setup complete message further includes a routing identifier (ID), and the routing identifier identifies the positioning device. For example, the routing identifier is included in the dedicatedNAS-message of the RRC setup complete message.

Figure 5A:
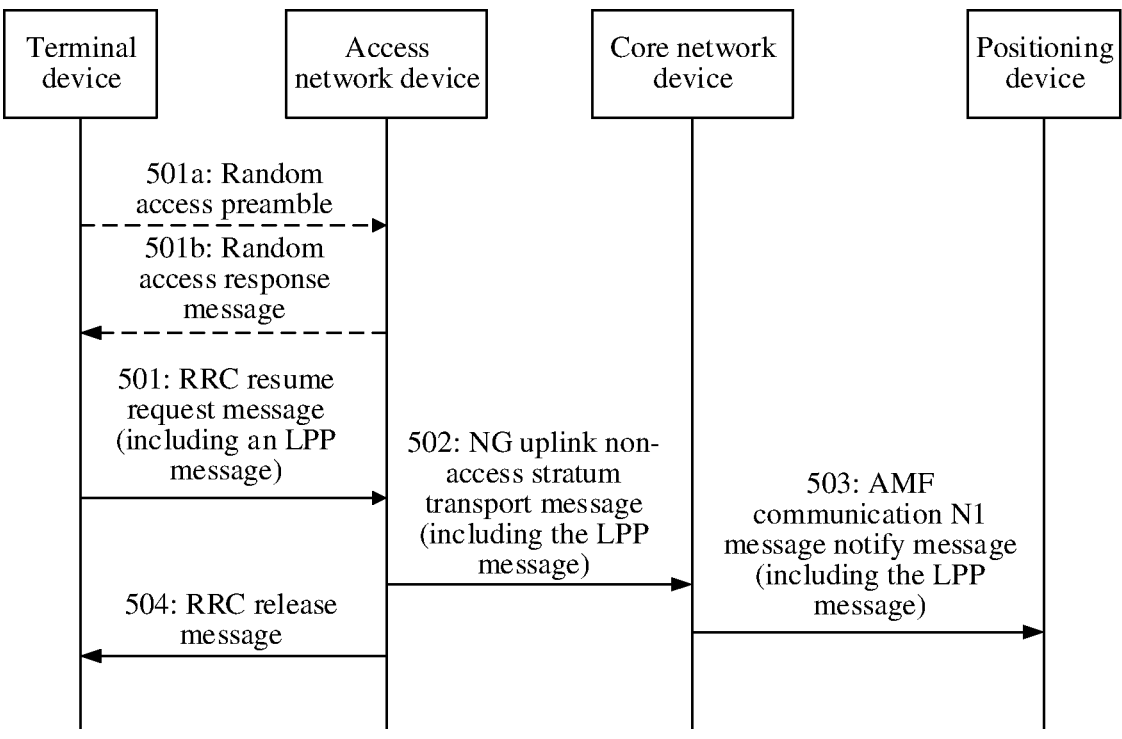
FIG. 5A is a schematic diagram of another embodiment of a communication method according to embodiments of this application.

FIG. 5A is a schematic diagram of another embodiment of a communication method according to embodiments of this application. In FIG. 5A, the communication method includes the following steps.

501: A terminal device sends an RRC resume request message to an access network device, where the RRC resume request message includes an LPP message. Accordingly, the access network device receives the RRC resume request message from the terminal device.

In this embodiment, the terminal device is in an inactive state, and the RRC resume request message includes the LPP message from the terminal device, in other words, the LPP message is an LPP message sent by the terminal device to a positioning device. The RRC resume request message is used by the terminal device to request to resume an RRC connection to the access network device.

Content included in the LPP message is similar to content included in the LPP message in step 401 in the embodiment shown in FIG. 4A. For details, refer to related descriptions of the LPP message in step 401 in the embodiment shown in FIG. 4A.

For example, in step 206 of the embodiment shown in FIG. 2A, after the terminal device receives the information that is included in the LPP message from the positioning device in step 202 of the embodiment shown in FIG. 2A and that indicates the terminal device in the non-connected state to send the positioning information of the terminal device to the positioning device, after the terminal device is released to the non-connected state, the terminal device in the non-connected state sends the positioning information of the terminal device to the positioning device. For example, the LPP message from the positioning device in step 202 of the embodiment shown in FIG. 2A is the request provide location information (request location information) message, and the provide location information message includes indication information indicating the terminal device in the non-connected state to send, to the positioning device, the measurement result of the PRS measured by the terminal device. After the terminal device is released to the non-connected state, the terminal device may continue to measure the PRS. Then, the terminal device sends, to the positioning device via the LPP message, the measurement result of the PRS measured by the terminal device, in other words, the terminal device may send a provide location information message (namely, the LPP message of the terminal device) via the RRC resume request message in step 501, where the provide location information message includes the measurement result of the PRS measured by the terminal device.

Optionally, the LPP message is carried in a first LPP PDU of the RRC resume request message.

Specifically, the RRC resume request message includes a dedicatedNAS-message, the dedicatedNAS-message includes the first LPP PDU, and the first LPP PDU includes the LPP message. For example, the first LPP PDU is the LPP message.

The foregoing shows a carrying manner in which the first LPP PDU is carried in the dedicatedNAS-message of the RRC resume request message. In actual application, the first LPP PDU may alternatively be carried in another information element of the RRC resume request message. This is not specifically limited in this application.

The RRC resume request message further includes a routing identifier. For example, the routing identifier is carried in the dedicatedNAS-message of the RRC resume request message. For specific related descriptions of the routing identifier, refer to related descriptions in step 401 in the embodiment shown in FIG. 4A.

Optionally, the RRC resume request message further includes a cause value. The cause value indicates that the RRC resume request message is used for reporting any one of the following information: the LLP message, a NAS message, or the positioning information of the terminal device, and the NAS message includes the LPP message. A specific form and content of the cause value are similar to those of the cause value in step 401 in the embodiment shown in FIG. 4A. For details, refer to related descriptions in step 401 in the embodiment shown in FIG. 4A.

Before step 501, this embodiment further includes step 501a and step 501b, and step 501a and step 501b are performed before step 501.

501a: The terminal device sends a random access preamble to the access network device. Accordingly, the access network device receives the random access preamble from the terminal device.

501b: The access network device sends a random access response message to the terminal device. Accordingly, the terminal device receives the random access response message from the access network device.

502: The access network device sends an NG uplink non-access stratum transport (NGAP uplink nas transport) message to a core network device, where the NG uplink non-access stratum transport message includes the LPP message. Accordingly, the core network device receives the NG uplink non-access stratum transport message from the access network device.

The LPP message is carried in a third NAS PDU of the NG uplink non-access stratum transport message.

Specifically, the access network device receives the RRC resume request message, and obtains the LPP message from the RRC resume request message. Then, the access network device sends the LPP message to the core network device via the third NAS PDU of the NG uplink non-access stratum transport message.

Optionally, the NG uplink non-access stratum transport message includes the third NAS PDU, the third NAS PDU includes a fourth LPP PDU, and the fourth LPP PDU includes the LPP message. For example, the fourth LPP PDU is the LPP message.

Specifically, the access network device sends the fourth LPP PDU to the core network device via the NG uplink non-access stratum transport message.

The foregoing shows a carrying manner in which the fourth LPP PDU is carried in the third NAS PDU of the NG uplink non-access stratum transport message. In actual application, the fourth LPP PDU may alternatively be carried in another information element of the NG uplink non-access stratum transport message. This is not specifically limited in this application.

The NG uplink non-access stratum transport message shown in step 502 is merely an example. In actual application, in step 502, the access network device may send the LPP message to the core network device via another message. This is not specifically limited in this application.

503: The core network device sends an AMF communication N1 message notify (Namf_Communication_N1MessageNotify) message to the positioning device, where the AMF communication N1 message notify message includes the LPP message. Accordingly, the positioning device receives the AMF communication N1 message notify message from the core network device.

Optionally, the LPP message is carried in a third LPP PDU of the AMF communication N1 message notify message.

Specifically, the AMF communication N1 message notify message includes the third LPP PDU, and the third LPP PDU includes the LPP message. For example, the third LPP PDU is the LPP message.

The AMF communication N1 message notify message shown in step 503 is merely an example. In actual application, in step 503, the core network device may alternatively send the LPP message to the positioning device via another message. This is not specifically limited in this application.

In a possible implementation, as shown in FIG. 5B, the RRC resume request message in step 501 further includes at least one of the following: a selected-PLMN-ID, an UplinkTxDirectCurrentList, or a dedicatedNAS-message, to be used by the terminal device to request to resume a NAS connection between the core network device and the terminal device.

In other words, it may be understood as that the RRC resume request message includes all or some of information elements of an RRC resume complete message in an existing process.

In this implementation, as shown in FIG. 5B, the NG uplink non-access stratum transport message in step 502 further includes at least one of the following: the selected-PLMN-ID or the dedicatedNAS-message. In this implementation, this embodiment further includes step 503*a*.

503*a*: The core network device resumes the NAS connection between the core network device and the terminal device.

It should be noted that step 503*a* and step 503 are not subject to a fixed execution sequence. Step 503*a* may be performed before step 503; or step 503 may be performed before step 503*a*; or step 503*a* and step 503 are simultaneously performed based on a case. This is not specifically limited in this application.

504: The access network device sends an RRC release message to the terminal device. Accordingly, the terminal device receives the RRC release message from the access network device.

After the access network device receives the RRC resume request message of the terminal device in step 501, the access network device determines not to allow to resume an RRC connection to the terminal device. In this case, the access network device may send the RRC release message to the terminal device, so that the terminal device keeps in the non-connected state, and the terminal device in the non-connected state sends the LPP message to the positioning device.

It should be noted that step 504 is performed after step 501. Step 504 and steps 502 to 503 are not subject to a fixed execution sequence. Step 504 may be first performed, or steps 502 to 503 may be first performed, or step 504 and steps 502 to 503 are simultaneously performed based on a case. This is not specifically limited in this application.

In this embodiment of this application, the terminal device sends the RRC resume request message to the access network device, where the RRC resume request message includes the LPP message from the terminal device. Then, the access network device sends the NG uplink non-access stratum transport message to the core network device, where the NG uplink non-access stratum transport message includes the LPP message from the terminal device. The core network device sends the AMF communication N1 message notify message to the positioning device, where the AMF communication N1 message notify message includes the LPP message from the terminal device. The access network device feeds back the RRC release message to the terminal device. It can be learned that, in this embodiment of this application, the terminal device in the inactive state reports the LPP message to the positioning device via the RRC resume request message. The terminal device does not need to initiate access and enter a connected state before sending the LPP message of the terminal device to the positioning device, so that the terminal device can send the LPP message of the terminal device to the positioning device earlier, to reduce a delay in sending the LPP message by the terminal device to the positioning device, and avoid an extra delay caused by positioning of the terminal device by the positioning device. In addition, the terminal device in the non-connected state may report the LPP message to the positioning device. For a terminal device without a data service, the terminal device keeps in the non-connected state, to reduce power consumption of the terminal device.

This application further provides an embodiment. The terminal device requests to access a network through two-step random access. Specifically, a difference between this embodiment and the embodiment shown in FIG. 5A lies in step 501*a*, step 501*b*, and step 501 in the embodiment shown in FIG. 5A.

Step 501*a* and step 501*b* are not performed, and step 501 is replaced with a step in which the terminal device sends a message A to the access network device, where the message A is a message A in a two-step random access process, and the message A includes a random access preamble and a payload on a physical uplink shared channel. In this embodiment, the message A includes an LPP message, in other words, the LPP message is carried in the message A, and the LPP message is an LPP message sent by the terminal device to the positioning device. The message A and the LPP message are similar to the message A and the LPP message in step 401 in the embodiment shown in FIG. 4C. For details, refer to related descriptions of the message A and the LPP message in step 401 in the embodiment shown in FIG. 4C. Details are not described herein again.

This application further provides an embodiment. This embodiment is similar to the embodiment shown in FIG. 5A, and a difference lies in step 504 in the embodiment shown in FIG. 5A.

Step 504 is replaced with a step in which the access network device sends an RRC resume message to the terminal device. Accordingly, the terminal device receives the RRC resume message from the terminal device.

Specifically, the terminal device initiates an RRC resume request to the access network device, and the access network device may accept the RRC resume request of the terminal device. Then, the access network device sends the RRC resume message to the terminal device, so that the terminal device accesses a network and enters a connected state.

In this embodiment, the access network device accepts the RRC resume request of the terminal device, so that the terminal device enters the connected state. For example, when an RRC resume request process shown in FIG. 5A is used for other transmission of the terminal device, the access network device may accept the RRC resume request of the terminal device, so that the terminal device performs other transmission. It can be learned that, when the terminal device is in an inactive state, the terminal device reports an LPP message to the positioning device via an RRC resume request message, so that the terminal device in a non-connected state reports the LPP message to the positioning device. The terminal device does not need to initiate access and enter the connected state before sending the LPP message of the terminal device to the positioning device, so that the terminal device can send the LPP message of the terminal device to the positioning device earlier, to reduce a delay in sending the LPP message by the terminal device to the positioning device, and avoid an extra delay caused by positioning of the terminal device by the positioning device.

This application further provides an embodiment. This embodiment is similar to the embodiment shown in FIG. 5A, and a difference lies in step 501 in the embodiment shown in FIG. 5A.

Step 501 is replaced with a step in which the terminal device sends an RRC resume complete message to the access network device, where the RRC resume complete message includes an LPP message. Accordingly, the access network device receives the RRC resume complete message from the terminal device.

In this embodiment, the terminal device is in an inactive state, and the RRC resume complete message includes the LPP message from the terminal device. Content of the LPP message is similar to content of the LPP message in step 501 in the embodiment shown in FIG. 5A. For details, refer to related descriptions of the LPP message in step 501 in the embodiment shown in FIG. 5A.

If the RRC resume complete message includes the LPP message, an RRC resume request message does not include the LPP message.

Optionally, the LPP message is carried in an LPP PDU of the RRC resume complete message.

Specifically, the RRC resume complete message includes a dedicatedNAS-message, the dedicatedNAS-message of the RRC setup complete message includes the LPP PDU, and the LPP PDU includes the LPP message. For example, the LPP PDU is the LPP message.

The foregoing shows a carrying manner in which the LPP PDU is carried in the dedicatedNAS-message of the RRC resume complete message. In actual application, the LPP PDU may alternatively be carried in another information element of the RRC resume complete message. This is not specifically limited in this application.

In a possible implementation, the RRC resume complete message further includes a routing identifier (ID), and the routing identifier identifies the positioning device. For example, the routing identifier is included in the dedicated-NAS-message of the RRC resume complete message.

Optionally, the RRC setup complete message further includes a cause value. The cause value indicates that the RRC resume complete message is used for reporting any one of the following information: the LLP message, a NAS message, or positioning information of the terminal device, and the NAS message carries the LPP message. Related descriptions of the cause value are similar to the cause value in step 401 in the embodiment shown in FIG. 4A. For details, refer to related descriptions of the cause value in step 401 in the embodiment shown in FIG. 4A. Details are not described herein again.

Figure 6:
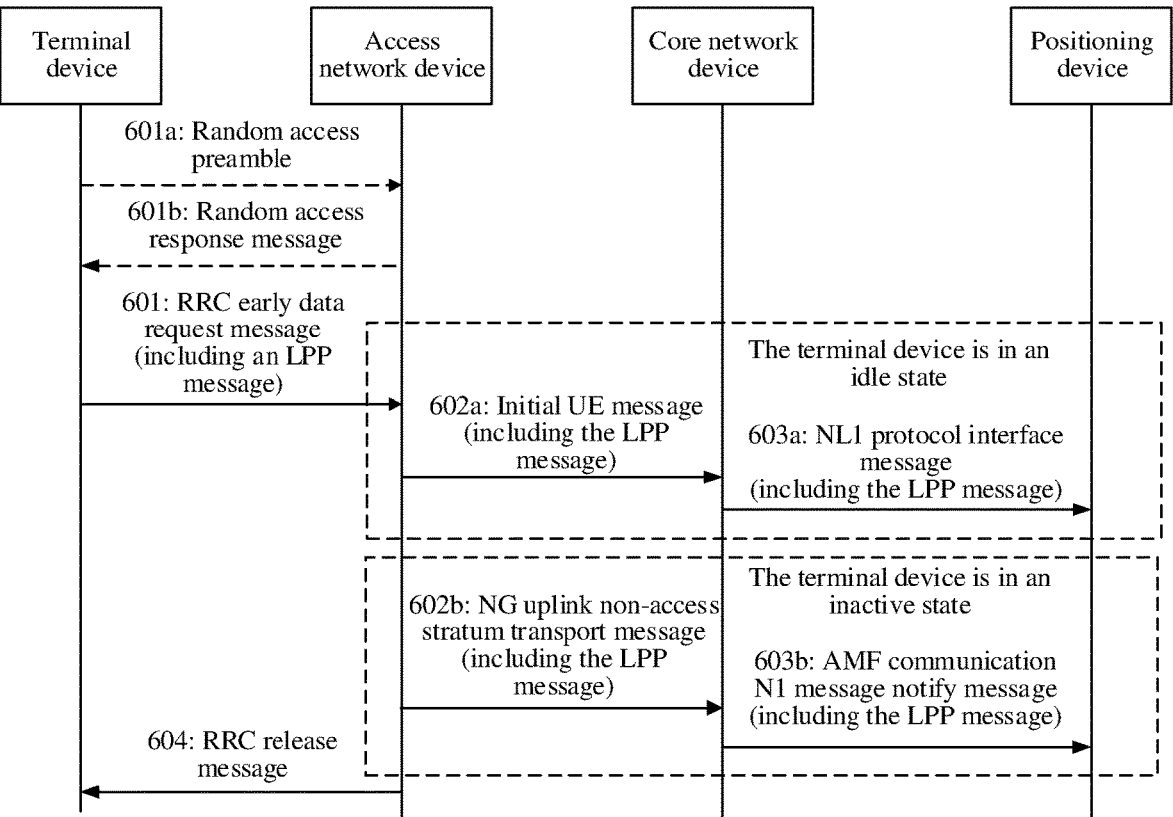
FIG. 6 is a schematic diagram of another embodiment of a communication method according to embodiments of this application.

FIG. 6 is a schematic diagram of another embodiment of a communication method according to embodiments of this application. In FIG. 6, the communication method includes the following steps.

601: A terminal device sends an RRC early data request message to an access network device, where the RRC early data request message includes an LPP message. Accordingly, the access network device receives the RRC early data request message from the terminal device.

In this embodiment, the terminal device is in an idle state or an inactive state, and the RRC early data request message is used by the terminal device to send data or information to a network. In this embodiment, the RRC early data request message includes the LPP message from the terminal device, in other words, the LPP message is an LPP message sent by the terminal device to a positioning device.

Content included in the LPP message is similar to content included in the LPP message in step 401 in the embodiment shown in FIG. 4A. For details, refer to related descriptions of the LPP message in step 401 in the embodiment shown in FIG. 4A.

For example, in step 206 of the embodiment shown in FIG. 2A, after the terminal device receives the information that is included in the LPP message from the positioning device in step 202 of the embodiment shown in FIG. 2A and that indicates the terminal device in the non-connected state to send the positioning information of the terminal device to the positioning device, after the terminal device is released to the non-connected state, the terminal device in the non-connected state sends the positioning information of terminal device to the positioning device. For example, the LPP message from the positioning device in step 202 of the embodiment shown in FIG. 2A is the request provide location information message, and the provide location information message includes indication information indicating the terminal device in the non-connected state to send, to the positioning device, the measurement result of the PRS measured by the terminal device. After the terminal device is released to the non-connected state, the terminal device may continue to measure the PRS. Then, the terminal device sends, to the positioning device via the LPP message, the measurement result of the PRS measured by the terminal device, in other words, the terminal device may send a provide location information message (namely, the LPP message of the terminal device) via an RRC request message in step 601, where the provide location information message includes the measurement result of the PRS measured by the terminal device.

Optionally, the LPP message is carried in a first LPP PDU of the RRC early data request message.

Specifically, the RRC early data request message includes a dedicatedNAS-message, the dedicatedNAS-message includes the first LPP PDU, and the first LPP PDU includes the LPP message. For example, the first LPP PDU is the LPP message.

The foregoing shows a carrying manner in which the first LPP PDU is carried in the dedicatedNAS-message of the RRC early data request message. In actual application, the first LPP PDU may alternatively be carried in another information element of the RRC early data request message. This is not specifically limited in this application.

The RRC early data request message further includes a routing identifier. For example, the routing identifier is carried in the dedicatedNAS-message of the RRC early data request message. For specific related descriptions of the routing identifier, refer to related descriptions in step 401 in the embodiment shown in FIG. 4A.

Optionally, the RRC early data request message further includes a cause value. The cause value indicates that the RRC early data request message is used for reporting any one of the following information: the LLP message, a NAS message, or the positioning information of the terminal device, and the NAS message includes the LPP message. A specific form and content of the cause value are similar to those of the cause value in step 401 in the embodiment shown in FIG. 4A. For details, refer to related descriptions in step 401 in the embodiment shown in FIG. 4A.

Before step 601, this embodiment further includes step 601a and step 601b, and step 601a and step 601b are performed before step 601.

601a: The terminal device sends a random access preamble to the access network device. Accordingly, the access network device receives the random access preamble from the terminal device.

601b: The access network device sends a random access response message to the terminal device. Accordingly, the terminal device receives the random access response message from the access network device.

The RRC early data request message in step 601 is merely an example message name. In actual application, the message in step 601 may alternatively have another name. This is not specifically limited in this application.

In this embodiment, the terminal device is in the idle state or the inactive state. The following describes a subsequent process with reference to the two states of the terminal device.

If the terminal device is in the idle state, step 602a and step 603a are performed, and then step 604 is performed.

602a: The access network device sends an initial UE message to a core network device, where the initial UE message includes the LPP message. Accordingly, the core network device receives the initial UE message from the access network device.

603a: The core network device sends an NL1 protocol interface message to the positioning device, where the NL1 protocol interface message includes the LPP message. Accordingly, the positioning device receives the LPP message from the core network device.

Step 602a and step 603a are similar to step 402 and step 403 in the embodiment shown in FIG. 4A. For details, refer to related descriptions of step 402 and step 403 in the embodiment shown in FIG. 4A. Details are not described herein again.

If the terminal device is in the inactive state, step 602b and step 603b are performed, and then step 604 is performed.

602b: The access network device sends an NG uplink non-access stratum transport (NGAP uplink nas transport) message to a core network device, where the NG uplink non-access stratum transport message includes the LPP message. Accordingly, the core network device receives the NG uplink non-access stratum transport message from the access network device.

603b: The core network device sends an AMF communication N1 message notify (Namf_Communication_N1MessageNotify) message to the positioning device, where the AMF communication N1 message notify message includes the LPP message. Accordingly, the positioning device receives the AMF communication N1 message notify message from the core network device.

Step 602b and step 603b are similar to step 502 and step 503 in the embodiment shown in FIG. 5A. For details, refer to related descriptions of step 502 and step 503 in the embodiment shown in FIG. 5A. Details are not described herein again.

Optionally, the embodiment shown in FIG. 6 further includes step 604, and step 604 is performed after step 601.

604: The access network device sends an RRC release message to the terminal device. Accordingly, the terminal device receives the RRC release message from the access network device.

When the terminal device is in the idle state, step 604 and steps 602a to 603a are not subject to a fixed execution sequence. Step 604 may be performed first, or steps 602a to 603a may be performed first, or step 604 and steps 602a to 603a are performed simultaneously based on a case. This is not specifically limited in this application.

When the terminal device is in the inactive state, step 604 and steps 602b to 603b are not subject to a fixed execution sequence. Step 604 may be performed first, or steps 602b to 603b may be performed first, or step 604 and steps 602b to 603b are performed simultaneously based on a case. This is not specifically limited in this application.

In this embodiment of this application, the terminal device sends the RRC early data request message to the access network device, where the RRC early data request message includes the LPP message from the terminal device. If the terminal device is in the idle state, the access network device sends the initial UE message to the core network device, where the initial UE message includes the LPP message. The core network device sends the LPP message to the positioning device. The access network device sends the RRC release message to the terminal device. If the terminal device is in the inactive state, the access network device sends the NG uplink non-access stratum transport message to the core network device, where the NG uplink non-access stratum transport message includes the LPP message from the terminal device. The core network device sends the AMF communication N1 message notify message to the positioning device, where the AMF communication N1 message notify message includes the LPP message from the terminal device. The access network device feeds back the RRC release message to the terminal device. It can be learned that, in this embodiment of this application, the terminal device in the non-connected state (including the idle state or the inactive state) reports the LPP message to the positioning device via the RRC early data request message. The terminal device does not need to initiate access and enter a connected state before sending the LPP message of the terminal device to the positioning device, so that the terminal device can send the LPP message of the terminal device to the positioning device earlier, to reduce a delay in sending the LPP message by the terminal device to the positioning device, and avoid an extra delay caused by positioning of the terminal device by the positioning device. In addition, the terminal device in the non-connected state may report the LPP message to the positioning device. For a terminal device without a data service, the terminal device keeps in the non-connected state, to reduce power consumption of the terminal device.

This application further provides an embodiment. The terminal device requests to access a network through two-step random access. Specifically, a difference between this embodiment and the embodiment shown in FIG. 6 lies in step 601a, step 601b, and step 601 in the embodiment shown in FIG. 6.

Step 601a and step 601b are not performed, and step 601 is replaced with a step in which the terminal device sends a message A to the access network device, where the message A is a message A in a two-step random access process, and the message A includes a random access preamble and a payload on a physical uplink shared channel. In this embodiment, the message A includes an LPP message, in other words, the LPP message is carried in the message A, and the LPP message is an LPP message sent by the terminal device to the positioning device. The message A and the LPP message are similar to the message A and the LPP message in step 401 in the embodiment shown in FIG. 4C. For details, refer to related descriptions of the message A and the LPP message in step 401 in the embodiment shown in FIG. 4C. Details are not described herein again.

The embodiments shown in FIG. 4A, FIG. 5A, and FIG. 6 may be performed based on the embodiment shown in FIG. 2A. To be specific, in the embodiment shown in FIG. 2A, the terminal device obtains the LPP message from the positioning device, where the LPP message from the positioning device includes the information indicating the terminal device in the non-connected state to send the positioning information to the positioning device. In this case, the terminal device in the non-connected state may report the LPP message of the terminal device to the positioning device. For details, refer to specific implementation processes of the embodiments shown in FIG. 4A, FIG. 5A, and FIG. 6.

To enable the terminal device in the non-connected state to report the LPP message to the positioning device, an embodiment of this application further provides another embodiment. The following provides descriptions with reference to the embodiment shown in FIG. 7.

Figure 7:
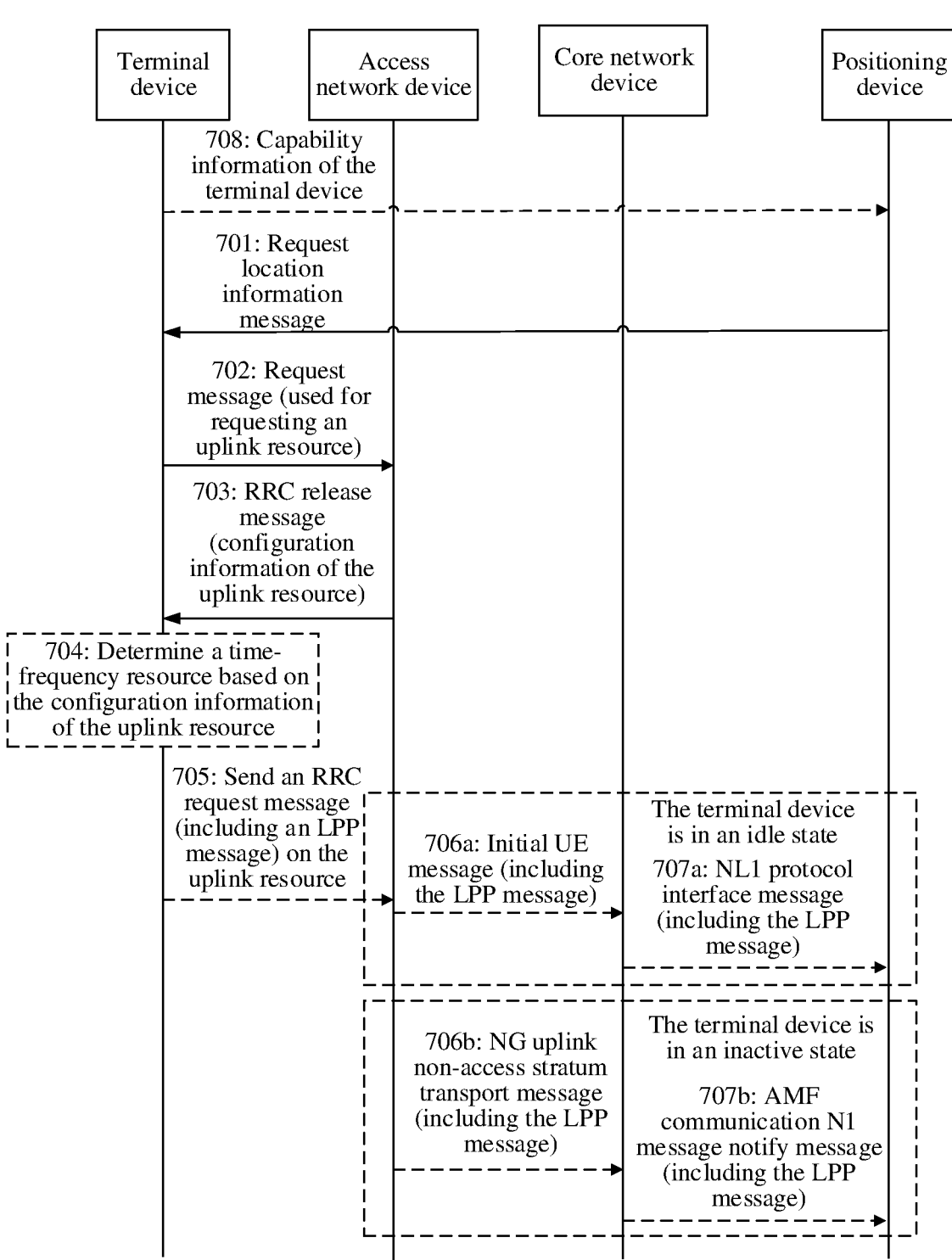
FIG. 7 is a schematic diagram of another embodiment of a communication method according to embodiments of this application.

FIG. 7 is a schematic diagram of another embodiment of a communication method according to embodiments of this application. In FIG. 7, the communication method includes the following steps.

701: A positioning device sends a request location information message to a terminal device. Accordingly, the terminal device receives the request location information message from the positioning device.

The request location information message includes information indicating the terminal device in a non-connected state to report positioning information of the terminal device to the positioning device, or includes information indicating the terminal device to report positioning information of the terminal device to the positioning device on a preconfigured uplink resource.

It should be noted that the information indicating the terminal device in the non-connected state to report the positioning information of the terminal device to the positioning device is indication information or information of another type. This is not specifically limited in this application. The information indicating the terminal device to report the positioning information of the terminal device to the positioning device on the preconfigured uplink resource is indication information or information of another type. This is not specifically limited in this application.

702: The terminal device sends a request message to an access network device. Accordingly, the terminal device receives the request message from the access network device.

Specifically, when the terminal device is in a connected state, after the terminal device receives the request location information message in step 701, the terminal device may determine, based on the information indicating the terminal device in the non-connected state to report the positioning information of the terminal device to the positioning device, to report the positioning information of the terminal device to the positioning device on the preconfigured uplink resource. Alternatively, the terminal device determines, based on the information indicating the terminal device to report the positioning information of the terminal device to the positioning device on the preconfigured uplink resource (PUR), to report the positioning information of the terminal device to the positioning device on the preconfigured uplink resource. Then, the terminal device sends the request message to the access network device, to request the preconfigured uplink resource. For example, the request message is a preconfigured uplink resource request (PUR config request) message.

It should be noted that, after the terminal device receives the request location information message in step 701, the terminal device may alternatively determine to perform reporting in a reporting manner in which the terminal device reports the LPP message in the embodiments shown in FIG. 4A, FIG. 5A, and FIG. 6. For details, refer to related descriptions in the foregoing embodiments. This embodiment mainly describes a process in which the terminal device reports the positioning information of the terminal device to the positioning device on the preconfigured uplink resource.

703: The access network device sends an RRC release message to the terminal device. Accordingly, the terminal device receives the RRC release message from the access network device.

The RRC release message includes configuration information (PUR config) of the preconfigured uplink resource allocated by the access network device to the terminal device.

Specifically, after the access network device receives the request message in step 702, the access network device determines to release an RRC connection to the terminal device, so that the terminal device enters the non-connected state. The non-connected state includes an idle state or an inactive state. In this case, the access network device sends the RRC release message to the terminal device, where the RRC release message includes the configuration information of the uplink resource allocated by the access network device to the terminal device, namely, the PUR configuration.

The configuration information of the uplink resource includes any one or more of the following information: a configuration identity (preconfigured uplink resource config identity, PUR config-ID), a user equipment identity (UE ID) (for example, a preconfigured uplink resource radio network temporary identifier (PUR-RNTI), a physical uplink control channel (PUCCH) configuration, and a physical uplink shared channel (PUSCH) configuration.

In this case, after the terminal device receives the configuration information of the preconfigured uplink resource sent by the access network device, the terminal device reports the LPP message of the terminal device based on the configuration information of the preconfigured uplink resource. For example, the LPP message is a provide location information message. Optionally, this embodiment further includes step 704 and step 705.

704: The terminal device determines an uplink resource based on the configuration information of the preconfigured uplink resource.

The uplink resource is used by the access network device to send an RRC request message.

705: The terminal device sends the RRC request message to the access network device on the uplink resource, where the RRC request message includes the LPP message. Accordingly, the access network device receives the RRC request message from the terminal device on the uplink resource.

For example, the terminal device still continues to measure a PRS in the non-connected state, to obtain the positioning information of the terminal device. In this case, the terminal device may send the RRC request message to the access network device on the uplink resource, where the RRC request message includes the provide location information message, namely, the LPP message of the terminal device.

Optionally, the LPP message is carried in an LPP PDU of the RRC request message.

Specifically, the RRC request message includes a dedicatedNAS-message, the dedicatedNAS-message includes the LPP PDU, and the LPP PDU includes the LPP message. For example, the LPP PDU is the LPP message.

The foregoing shows a carrying manner in which the LPP PDU is carried in the dedicatedNAS-message of the RRC request message. In actual application, the LPP PDU may alternatively be carried in another information element of the RRC request message. This is not specifically limited in this application.

The RRC request message further includes a routing identifier. For example, the routing identifier is carried in the dedicatedNAS-message of the RRC request message. For specific related descriptions of the routing identifier, refer to related descriptions in the embodiment shown in FIG. 4A, FIG. 5A, or FIG. 6.

Optionally, the RRC request message further includes a cause value. The cause value indicates that the RRC request message is used for reporting any one of the following information: the LLP message, a NAS message, or the positioning information of the terminal device, and the NAS message includes the LPP message. A specific form and content of the cause value are similar to those of the cause value in step 401 in the embodiment shown in FIG. 4A. For details, refer to related descriptions in step 401 in the embodiment shown in FIG. 4A.

In a possible implementation, when the terminal device is in the idle state, the RRC request message is an RRC setup request message. Alternatively, when the terminal device is in the inactive state, the RRC request message is an RRC resume request message.

In another possible implementation, regardless of whether the terminal device is in the idle state or the inactive state, the RRC request message in step 705 is an RRC early data request message in an RRC early data request process of the terminal device in step 705.

The foregoing example describes specific message forms of the RRC request message. Specifically, a form or a name of the RRC request message is not limited in this application.

When the terminal device is in the idle state, this embodiment further includes step 706a and step 706b, and step 706a and step 706b are performed after step 705.

706a: The access network device sends an initial UE message to a core network device, where the initial UE message includes the LPP message. Accordingly, the core network device receives the initial UE message from the access network device.

707a: The core network device sends an NL1 protocol interface message to the positioning device, where the NL1 protocol interface message includes the LPP message. Accordingly, the positioning device receives the NL1 protocol interface message from the core network device.

Steps 706a to 707a are similar to step 402 and step 403 in the embodiment shown in FIG. 4A. For details, refer to related descriptions of steps 402 to 403 in the embodiment shown in FIG. 4A. Details are not described herein again.

When the terminal device is in the inactive state, this embodiment further includes step 706b and step 707b, and step 706b and step 707b are performed after step 705.

706b: The access network device sends an NG uplink non-access stratum transport message to a core network device, where the NG uplink non-access stratum transport message includes the LPP message. Accordingly, the core network device receives the NG uplink non-access stratum transport message from the access network device.

707b: The core network device sends an AMF communication N1 message notify message to the positioning device, where the AMF communication N1 message notify message includes the LPP message. Accordingly, the positioning device receives the AMF communication N1 message notify message from the core network device.

Steps 706b to 707b are similar to steps 502 to 503 in the embodiment shown in FIG. 5A. For details, refer to related descriptions of steps 502 to 503 in the embodiment shown in FIG. 5A. Details are not described herein again.

Optionally, the embodiment shown in FIG. 7 further includes step 708, and step 708 is performed before step 701.

708: The terminal device sends capability information of the terminal device to the positioning device. Accordingly, the positioning device receives the capability information of the terminal device.

The capability information of the terminal device indicates whether the terminal device supports a capability of reporting the positioning information of the terminal device to the positioning device on the preconfigured uplink resource.

Specifically, the capability information of the terminal device includes information indicating capability information of the PUR of the terminal device. The information indicating the capability information of the PUR of the terminal device is indication information or information of another type. This is not specifically limited in this application.

Optionally, the terminal device sends the capability information of the terminal device to the positioning device via a provide capability message.

In this embodiment of this application, the positioning device sends the request location information message to the terminal device, where the request location information message includes the information indicating the terminal device in the non-connected state to report the positioning information of the terminal device to the positioning device, or includes the information indicating the terminal device to report the positioning information of the terminal device to the positioning device on the preconfigured uplink resource. Then, the terminal device sends the request message to the access network device based on the request location information message, where the request message is for requesting the preconfigured uplink resource. The access network device sends the RRC release message to the terminal device, where the RRC release message includes the configuration information of the preconfigured uplink resource allocated by the access network device to the terminal device. In this way, the terminal device can determine the uplink resource based on the configuration information of the preconfigured uplink resource, and send the RRC request message to the access network device on the uplink resource, to report the LPP message of the terminal device, so that the terminal device in the non-connected state sends the LPP message to the positioning device. The terminal device does not need to initiate access and enter the connected state before sending the LPP message of the terminal device to the positioning device, so that the terminal device can send the LPP message of the terminal device to the positioning device earlier, to reduce a delay in sending the LPP message by the terminal device to the positioning device, and avoid an extra delay caused by positioning of the terminal device by the positioning device. In addition, the terminal device in the non-connected state may report the LPP message to the positioning device. For a terminal device without a data service, the terminal device keeps in the non-connected state, to reduce power consumption of the terminal device.

Figure 8:
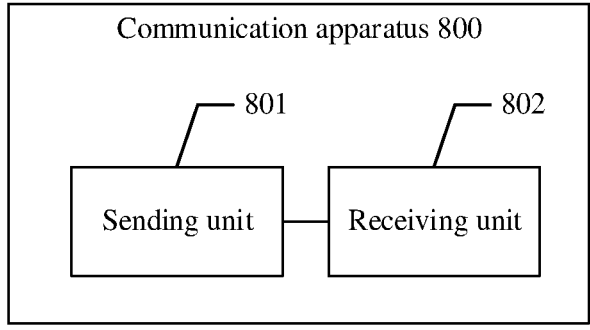
FIG. 8 is a schematic diagram of a structure of a communication apparatus according to an embodiment of this application.

The following describes a communication apparatus according to an embodiment of this application. FIG. 8 is a schematic diagram of a structure of a communication apparatus 800 according to an embodiment of this application. The communication apparatus 800 includes a sending unit 801 and a receiving unit 802.

Figure 2B:
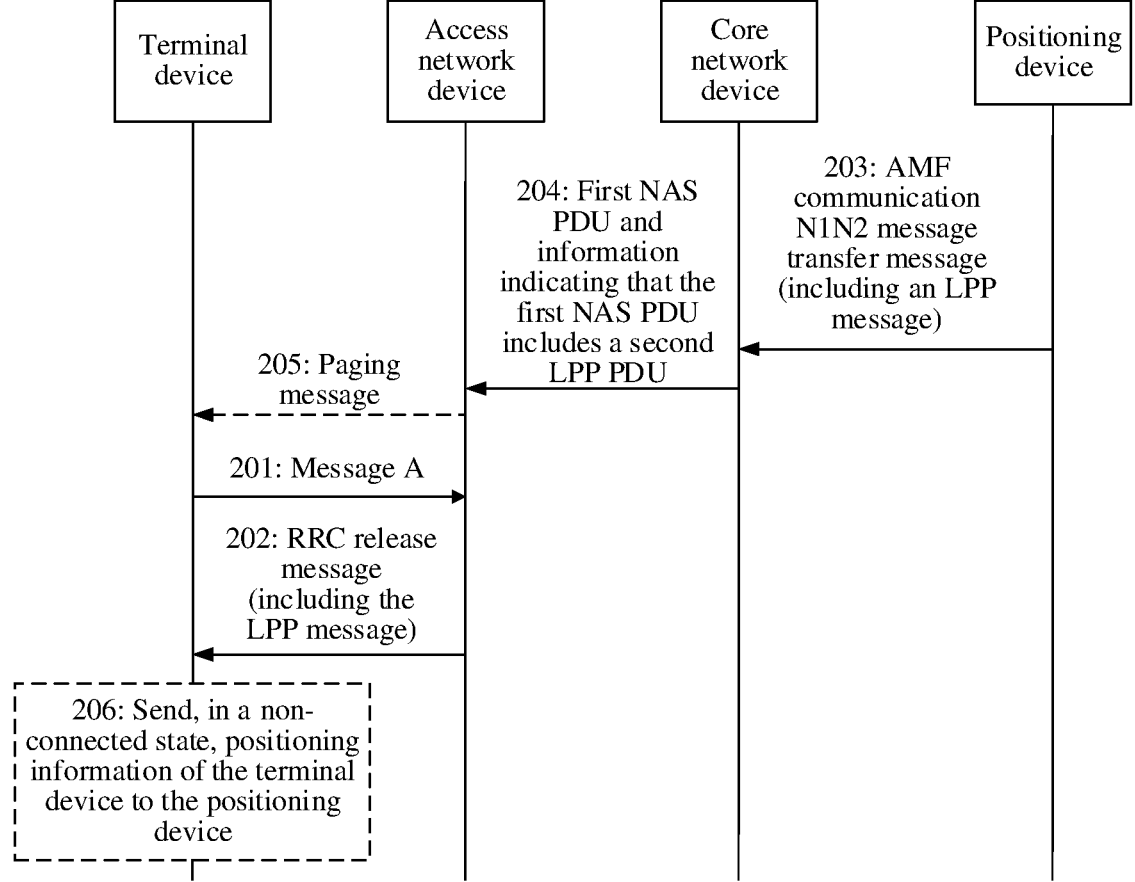
FIG. 2B is a schematic diagram of another embodiment of a communication method according to embodiments of this application.

When the communication apparatus 800 is a terminal device or a chip in the terminal device, the communication apparatus 800 may be configured to perform all or some of the steps performed by the terminal device in the embodiments shown in FIG. 2A, FIG. 2B, and FIG. 3. For details, refer to related descriptions in the method embodiments shown in FIG. 2A, FIG. 2B, and FIG. 3.

For example, the sending unit 801 is configured to perform step 201, step 201a, step 205, and step 206 in the embodiment shown in FIG. 2A. The receiving unit 802 is configured to perform step 202 and step 201b in the embodiment shown in FIG. 2A.

For example, the sending unit 801 is configured to perform step 201 and step 206 in the embodiment shown in FIG. 2B. The receiving unit 802 is configured to perform step 202 and step 205 in the embodiment shown in FIG. 2B.

For example, the sending unit 801 is configured to perform step 301, step 301a, and step 309 in the embodiment shown in FIG. 3. The receiving unit 802 is configured to perform step 304 and step 301b in the embodiment shown in FIG. 3.

When the communication apparatus 800 is an access network device or a chip in the access network device, the communication apparatus 800 may be configured to perform all or some of the steps performed by the access network device in the embodiments shown in FIG. 2A, FIG. 2B, and FIG. 3. For details, refer to related descriptions in the method embodiments shown in FIG. 2A, FIG. 2B, and FIG. 3.

For example, the sending unit 801 is configured to perform step 202, step 201b, and step 205 in the embodiment shown in FIG. 2A. The receiving unit 802 is configured to perform step 201, step 201a, and step 204 in the embodiment shown in FIG. 2A.

For example, the sending unit 801 is configured to perform step 201 and step 205 in the embodiment shown in FIG. 2B. The receiving unit 802 is configured to perform step 201 and step 204 in the embodiment shown in FIG. 2B.

For example, the sending unit 801 is configured to perform step 302, step 304, step 301b, and step 305 in the embodiment shown in FIG. 3. The receiving unit 802 is configured to perform step 301, step 303, step 301a, and step 306 in the embodiment shown in FIG. 2A.

When the communication apparatus 800 is an access network device or a chip in the access network device, the communication apparatus 800 may be alternatively configured to perform all or some of the steps performed by the source access network device in the embodiment shown in FIG. 3. For details, refer to related descriptions in the method embodiment shown in FIG. 3.

For example, the sending unit 801 is configured to perform step 303 and step 306 in the embodiment shown in FIG. 3. The receiving unit 802 is configured to perform step 302 and step 308 in the embodiment shown in FIG. 3.

When the communication apparatus 800 is a terminal device or a chip in the terminal device, the communication apparatus 800 may be alternatively configured to perform all or some of the steps performed by the terminal device in the embodiments shown in FIG. 4A, FIG. 4B, FIG. 4C, FIG. 5A, FIG. 5B, and FIG. 6. For details, refer to related descriptions in the method embodiments shown in FIG. 4A, FIG. 4B, FIG. 4C, FIG. 5A, FIG. 5B, and FIG. 6.

For example, the sending unit 801 is configured to perform step 401 and step 401a in the embodiment shown in FIG. 4A. The receiving unit 802 is configured to perform step 404 and step 401b in the embodiment shown in FIG. 4A.

For example, the sending unit 801 is configured to perform step 401 in case 2 in the embodiment shown in FIG. 4B, and the receiving unit 802 is configured to perform step 402 in the embodiment shown in FIG. 4B.

For example, the sending unit 801 is configured to perform step 401 in the embodiment shown in FIG. 4C. The receiving unit 802 is configured to perform step 404 in the embodiment shown in FIG. 4C.

For example, the sending unit 801 is configured to perform step 501 and step 501a in the embodiment shown in FIG. 5A. The receiving unit 802 is configured to perform step 504 and step 501b in the embodiment shown in FIG. 5A.

For example, the sending unit 801 is configured to perform step 501 in the embodiment shown in FIG. 5B. The receiving unit 802 is configured to perform step 504 in the embodiment shown in FIG. 5A.

For example, the sending unit 801 is configured to perform step 601 and step 601a in the embodiment shown in FIG. 6. The receiving unit 802 is configured to perform step 604 and step 601b in the embodiment shown in FIG. 6.

When the communication apparatus 800 is an access network device or a chip in the access network device, the communication apparatus 800 may be alternatively configured to perform all or some of the steps performed by the access network device in the embodiments shown in FIG. 4A, FIG. 4B, FIG. 4C, FIG. 5A, FIG. 5B, FIG. 6, and FIG. 7. For details, refer to related descriptions in the method embodiments shown in FIG. 4A, FIG. 4C, FIG. 5A, FIG. 6, and FIG. 7.

For example, the sending unit 801 is configured to perform step 402, step 404, and step 401b in the embodiment shown in FIG. 4A. The receiving unit 802 is configured to perform step 401 and step 401a in the embodiment shown in FIG. 4A.

For example, the sending unit 801 is configured to perform step 402 and step 404 in case 1 or case 2 in the embodiment shown in FIG. 4B. The receiving unit 802 is configured to perform step 401 in the embodiment shown in FIG. 4B.

For example, the sending unit 802 is configured to perform step 402 and step 404 in the embodiment shown in FIG. 4C. The receiving unit 802 is configured to perform step 401 in the embodiment shown in FIG. 4C.

For example, the sending unit 801 is configured to perform step 502, step 504, and step 501b in the embodiment shown in FIG. 5A. The receiving unit 802 is configured to perform step 501 and step 501a in the embodiment shown in FIG. 5A.

For example, the sending unit 801 is configured to perform step 502 and step 504 in the embodiment shown in FIG. 5B. The receiving unit 802 is configured to perform step 501 in the embodiment shown in FIG. 5B.

For example, the sending unit 801 is configured to perform step 602a, step 604, and step 601b in the embodiment shown in FIG. 6, or the sending unit 801 is configured to perform step 602b, step 604, and step 601b in the embodiment shown in FIG. 6. The receiving unit 802 is configured to perform step 601 and step 601a in the embodiment shown in FIG. 6.

For example, the sending unit 801 is configured to perform step 703 and step 706a in the embodiment shown in FIG. 7, or the sending unit 801 is configured to perform step 703 and step 706b in the embodiment shown in FIG. 7. The receiving unit 802 is configured to perform step 702 and step 705.

When the communication apparatus 900 is a core network device or a chip in the core network device, the communication apparatus 900 may be configured to perform all or some of the steps performed by the core network device in the embodiments shown in FIG. 6 and FIG. 7. For details, refer to related descriptions in the method embodiments shown in FIG. 6 and FIG. 7.

For example, the sending unit 801 is configured to perform step 603*a* in the embodiment shown in FIG. 6, and the receiving unit 802 is configured to perform step 602*a* in the embodiment shown in FIG. 6. Alternatively, the sending unit 801 is configured to perform step 603*b* in the embodiment shown in FIG. 6, and the receiving unit 802 is configured to perform step 602*b* in the embodiment shown in FIG. 6.

For example, the sending unit 801 is configured to perform step 707*a* in the embodiment shown in FIG. 7, and the receiving unit 802 is configured to perform step 706*a* in the embodiment shown in FIG. 7. Alternatively, the sending unit 801 is configured to perform step 707*b* in the embodiment shown in FIG. 7, and the receiving unit 802 is configured to perform step 706*b* in the embodiment shown in FIG. 7.

Figure 9:
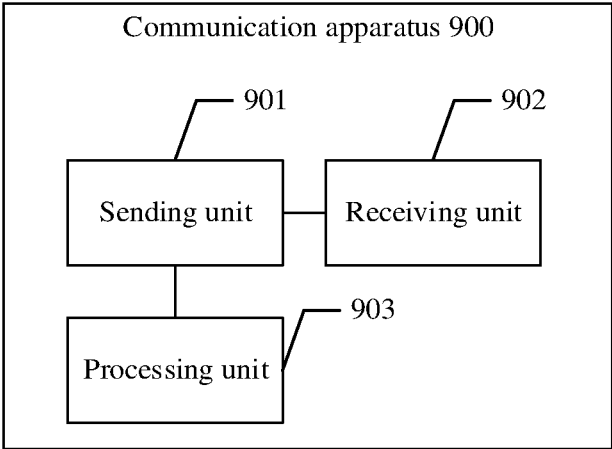
FIG. 9 is another schematic diagram of a structure of a communication apparatus according to an embodiment of this application.

The following describes a communication apparatus according to an embodiment of this application. FIG. 9 is a schematic diagram of a structure of a communication apparatus 900 according to an embodiment of this application. The communication apparatus 900 includes a sending unit 901 and a receiving unit 902. Optionally, the communication apparatus 900 further includes a processing unit 903.

When the communication apparatus 900 is a core network device or a chip in the core network device, the communication apparatus 900 may be configured to perform all or some of the steps performed by the core network device in the embodiments shown in FIG. 4A, FIG. 4B, FIG. 4C, FIG. 5A, and FIG. 5B. For details, refer to related descriptions in the method embodiments shown in FIG. 4A, FIG. 4B, FIG. 4C, FIG. 5A, and FIG. 5B.

For example, the sending unit 901 is configured to perform step 403 in the embodiment shown in FIG. 4A, and the receiving unit 902 is configured to perform step 402 in the embodiment shown in FIG. 4A.

For example, the sending unit 901 is configured to perform step 403 in case 1 in the embodiment shown in FIG. 4B, and the receiving unit 902 is configured to perform step 402 in case 1 in the embodiment shown in FIG. 4B. Alternatively, the sending unit 901 is configured to perform step 403 in case 2 in the embodiment shown in FIG. 4B, the receiving unit 902 is configured to perform step 402 in case 2 in the embodiment shown in FIG. 4B, and the processing unit 903 is configured to perform step 403*a* in case 2 in the embodiment shown in FIG. 4B.

For example, the sending unit 901 is configured to perform step 403 in the embodiment shown in FIG. 4C, and the receiving unit 902 is configured to perform step 402 in the embodiment shown in FIG. 4C.

For example, the sending unit 901 is configured to perform step 503 in the embodiment shown in FIG. 5A, and the receiving unit 902 is configured to perform step 502 in the embodiment shown in FIG. 5A.

For example, the sending unit 901 is configured to perform step 503 in the embodiment shown in FIG. 5B, the receiving unit 902 is configured to perform step 502 in the embodiment shown in FIG. 5B, and the processing unit 903 is configured to perform step 503*a* in the embodiment shown in FIG. 5B.

When the communication apparatus 900 is a terminal device or a chip in the terminal device, the communication apparatus 800 may be configured to perform all or some of the steps performed by the terminal device in the embodiment shown in FIG. 7. For details, refer to related descriptions in the method embodiment shown in FIG. 7.

For example, the sending unit 901 is configured to perform step 702, step 705, and step 708 in the embodiment shown in FIG. 7, the receiving unit 902 is configured to perform step 701 and step 703 in the embodiment shown in FIG. 7, and the processing unit 903 is configured to perform step 704.

Figure 10:
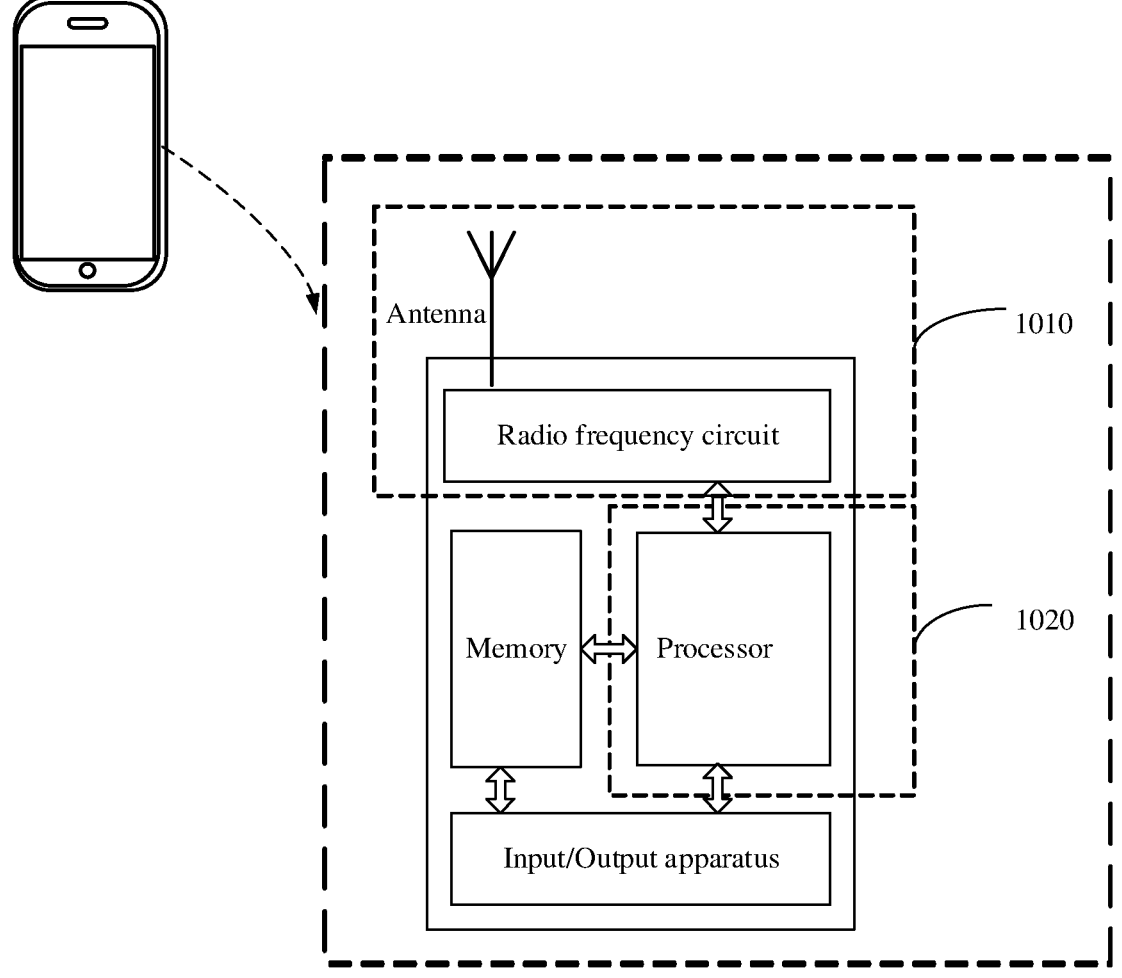
FIG. 10 is a schematic diagram of a structure of a terminal device according to an embodiment of this application.

FIG. 10 is a schematic diagram of a possible structure of a terminal device.

FIG. 10 is a simplified schematic diagram of the structure of the terminal device. For ease of understanding and illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and a radio frequency circuit that have a transceiver function may be considered as a transceiver unit of the terminal device, and a processor that has a processing function may be considered as a processing unit of the terminal device. As shown in FIG. 10, the terminal device includes a transceiver unit 1010 and a processing unit 1020. The transceiver unit may also be referred to as a transceiver machine, a transceiver, a transceiver apparatus, or the like. The processing unit may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. That is, the transceiver unit 1010 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1010 is configured to perform a sending operation and a receiving operation on the terminal device in the foregoing method embodiments, and the processing unit 1020 is configured to perform an operation other than the sending operation and the receiving operation of the terminal device in the foregoing method embodiments.

In a possible implementation, the transceiver unit 1010 is configured to perform step 201, step 201*a*, step 205, step 206, step 202, and step 201*b* in the embodiment shown in FIG. 2A, and/or the transceiver unit 1010 is further configured to perform other sending and receiving steps of the terminal device in embodiments of this application.

In another possible implementation, the transceiver unit 1010 is configured to perform step 201, step 206, step 202, and step 205 in the embodiment shown in FIG. 2B, and/or the transceiver unit 1010 is further configured to perform other sending and receiving steps of the terminal device in embodiments of this application.

In another possible implementation, the transceiver unit 1010 is configured to perform step 301, step 301*a*, step 309, step 304, and step 301*b* in the embodiment shown in FIG. 3, and/or the transceiver unit 1010 is further configured to perform other sending and receiving steps of the terminal device in embodiments of this application.

In another possible implementation, the transceiver unit 1010 is configured to perform step 401, step 401*a*, step 404, and step 401*b* in the embodiment shown in FIG. 4A, and/or the transceiver unit 1010 is further configured to perform other sending and receiving steps of the terminal device in embodiments of this application.

In another possible implementation, the transceiver unit 1010 is configured to perform step 401 and step 402 in case 2 in the embodiment shown in FIG. 4B, and/or the transceiver unit 1010 is further configured to perform other sending and receiving steps of the terminal device in embodiments of this application.

In another possible implementation, the transceiver unit 1010 is configured to perform step 401 and step 404 in the embodiment shown in FIG. 4C, and/or the transceiver unit 1010 is further configured to perform other sending and receiving steps of the terminal device in embodiments of this application.

In another possible implementation, the transceiver unit low is configured to perform step 501, step sola, step 504, and step 501*b* in the embodiment shown in FIG. 5A, and/or the transceiver unit 1010 is further configured to perform other sending and receiving steps of the terminal device in embodiments of this application.

In another possible implementation, the transceiver unit low is configured to perform step 501 and step 504 in the embodiment shown in FIG. 5B, and/or the transceiver unit 1010 is further configured to perform other sending and receiving steps of the terminal device in embodiments of this application.

In another possible implementation, the transceiver unit low is configured to perform step 601, step 601*a*, step 604, and step 601*b* in the embodiment shown in FIG. 6, and/or the transceiver unit 1010 is further configured to perform other sending and receiving steps of the terminal device in embodiments of this application.

In another possible implementation, the transceiver unit low is configured to perform step 702, step 705, step 708, step 701, and step 703 in the embodiment shown in FIG. 7, and/or the transceiver unit 1010 is further configured to perform other sending and receiving steps of the terminal device in embodiments of this application. The processing unit 1020 is configured to perform step 704, and/or the processing unit 1020 is further configured to perform another processing step of the terminal device in embodiments of this application.

When the terminal device is a chip, the chip includes a transceiver unit and a processing unit. The transceiver unit may be an input/output circuit or a communication interface. The processing unit is a processor, a microprocessor, an integrated circuit, or a logic circuit integrated on the chip. In the foregoing method embodiments, a sending operation corresponds to an output of the input/output circuit, and a receiving operation corresponds to an input of the input/output circuit.

Figure 11:
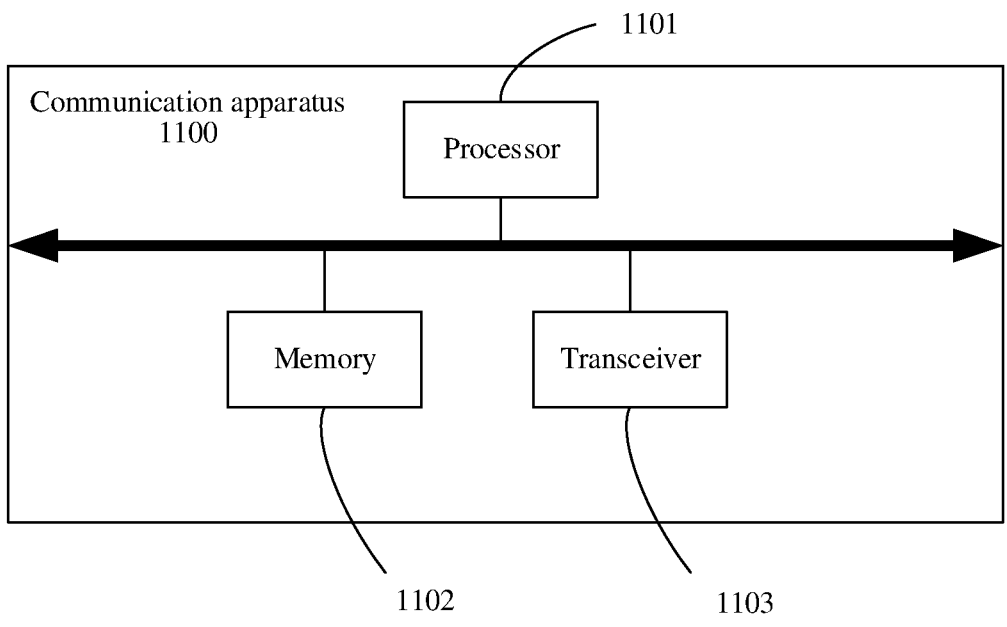
FIG. 11 is another schematic diagram of a structure of a communication apparatus according to an embodiment of this application.

This application further provides a communication apparatus. FIG. 11 is another schematic diagram of a structure of a communication apparatus 1100 according to an embodiment of this application.

The communication apparatus 1100 includes a processor 1101, a memory 1102, and a transceiver 1103.

The processor 1101, the memory 1102, and the transceiver 1103 are separately connected through a bus, and the memory stores computer instructions.

When the communication apparatus 1100 is an access network device or a chip in the access network device, the communication apparatus 1100 may be configured to perform the steps performed by the access network device in the embodiments shown in FIG. 2A, FIG. 2B, FIG. 3, FIG. 4A, FIG. 4B, FIG. 4C, FIG. 5A, FIG. 5B, FIG. 6, and FIG. 7. For details, refer to related descriptions in the foregoing method embodiments.

When the communication apparatus 1100 is an access network device or a chip in the access network device, the communication apparatus 1100 may be configured to perform the steps performed by the source access network device in the embodiment shown in FIG. 3. For details, refer to related descriptions in the foregoing method embodiments.

The sending unit 801 and the receiving unit 802 in FIG. 8 may be specifically the transceiver 1103 in this embodiment. Therefore, specific implementation of the transceiver 1103 is not described again.

When the communication apparatus 1100 is a core network device or a chip in the core network device, the communication apparatus 1100 may be configured to perform the steps performed by the core network device in the embodiments shown in FIG. 2A, FIG. 2B, FIG. 3, and FIG. 7. For details, refer to related descriptions in the foregoing method embodiments.

The sending unit 801 and the receiving unit 802 in FIG. 8 may be specifically the transceiver 1103 in this embodiment. Therefore, specific implementation of the transceiver 1103 is not described again.

When the communication apparatus 1100 is a core network device or a chip in the core network device, the communication apparatus 1100 may be configured to perform the steps performed by the core network device in the embodiments shown in FIG. 4A, FIG. 4B, FIG. 4C, FIG. 5A, FIG. 5B, and FIG. 6. For details, refer to related descriptions in the foregoing method embodiments.

The sending unit 901 and the receiving unit 902 in FIG. 9 may be specifically the transceiver 1103 in this embodiment. Therefore, specific implementation of the transceiver 1103 is not described again. The processing unit 903 in FIG. 9 may specifically be the processor 1101 in this embodiment. Therefore, specific implementation of the processor 1101 is not described again.

Figure 12:
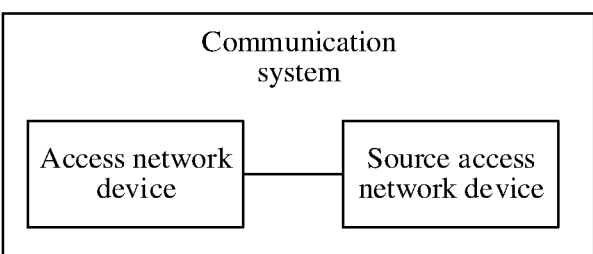
FIG. 12 is a schematic diagram of a communication system according to an embodiment of this application.

Refer to FIG. 12. An embodiment of this application further provides a communication system. The communication system includes an access network device and a source access network device. The access network device is configured to perform all or some of the steps performed by the access network device in the embodiment shown in FIG. 3. The source access network device is configured to perform all or some of the steps performed by the source access network device in the embodiment shown in FIG. 3.

Figure 13:
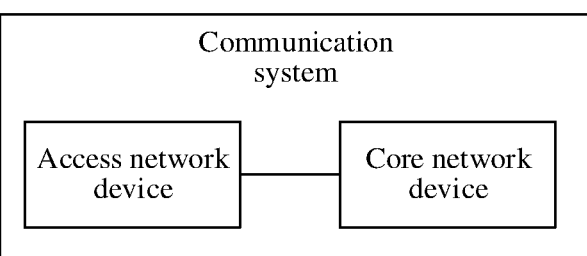
FIG. 13 is another schematic diagram of a communication system according to an embodiment of this application.

Refer to FIG. 13. An embodiment of this application further provides another communication system. The communication system includes an access network device and a core network device. The access network device is configured to perform all or some of the steps performed by the access network device in the embodiments shown in FIG. 4A, FIG. 4B, FIG. 4C, FIG. 5A, FIG. 5B, FIG. 6, and FIG. 7. The core network device is configured to perform all or some of the steps performed by the core network device in the embodiments shown in FIG. 4A, FIG. 4B, FIG. 4C, FIG. 5A, FIG. 5B, FIG. 6, and FIG. 7.

An embodiment of this application further provides a computer program product including computer instructions. When the computer program product runs on a computer, the computer is enabled to perform the communication methods in the embodiments shown in FIG. 2A, FIG. 2B, FIG. 3, FIG. 4A, FIG. 4B, FIG. 4C, FIG. 5A, FIG. 5B, FIG. 6, and FIG. 7.

An embodiment of this application further provides a computer-readable storage medium, including computer instructions. When the computer instructions are run on a computer, the computer is enabled to perform the communication methods in the embodiments shown in FIG. 2A, FIG. 2B, FIG. 3, FIG. 4A, FIG. 4B, FIG. 4C, FIG. 5A, FIG. 5B, FIG. 6, and FIG. 7.

An embodiment of this application further provides a chip apparatus, including a processor. The processor is configured to invoke a computer program or computer instructions stored in a memory, to enable the processor to perform the communication methods in the embodiments shown in FIG. 2A, FIG. 2B, FIG. 3, FIG. 4A, FIG. 4B, FIG. 4C, FIG. 5A, FIG. 5B, FIG. 6, and FIG. 7.

Optionally, the processor is coupled to the memory through an interface.

Optionally, the chip apparatus further includes the memory, and the memory stores the computer program or the computer instructions.

The processor mentioned in any of the foregoing embodiments may be a general-purpose central processing unit, a microprocessor, an application-specific integrated circuit (ASIC), or one or more integrated circuits for controlling program execution of the communication methods in the embodiments shown in FIG. 2A, FIG. 2B, FIG. 3, FIG. 4A, FIG. 4B, FIG. 4C, FIG. 5A, FIG. 5B, FIG. 6, and FIG. 7. The memory mentioned in any of the foregoing embodiments may be a read-only memory (ROM), another type of static storage device that can store static information and instructions, a random access memory (RAM), or the like.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on actual requirements to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, network device, local computing device, computing device, or data center to another website, computer, network device, local computing device, computing device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a network device, a local computing device, or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid-state drive, SSD)), or the like.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by using electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and there may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A communication method, comprising:
sending, by a terminal device, a radio resource control (RRC) resume request message to an access network device; and
receiving, by the terminal device, an RRC release message from the access network device, wherein the RRC release message comprises a long term evolution system positioning protocol (LPP) message, and the LPP message is from a positioning device, wherein:
the RRC release message comprises a dedicated non-access stratum message (dedicatedNAS-message),
the dedicatedNAS-message comprises a first LPP PDU,
the first LPP PDU comprises the LPP message,
the dedicatedNAS-message of the RRC release message comprises a routing identifier,
the routing identifier is usable by a core network device to identify the positioning device,
the positioning device is a location management function LMF device,
the LMF device is configured to perform positioning calculation and management on a location of the terminal device, and
the LPP message comprises information indicating the terminal device in a non-connected state to report positioning information of the terminal device to the positioning device: and
sending, by the terminal device in the non-connected state, a bearer message to the positioning device through the core network device, wherein the bearer message comprises the LPP message and the routing identifier.

2. The method according to claim 1, further comprising:
receiving, by the access network device, the RRC resume request message from the terminal device; and
sending, by the access network device, the RRC release message to the terminal device.

3. The method according to claim 2, wherein the method further comprises:
receiving, by the access network device from the core network device, a first non-access stratum protocol data unit (NAS PDU) and information indicating that the first NAS PDU comprises a second LPP PDU, wherein the second LPP PDU comprises the LPP message.

4. The method according to claim 1, wherein the LPP message is selected from the group consisting of: a request location information message, a request capability message, and a provide assistance data message.

5. The method according to claim 1, wherein the positioning information comprises at least one of: a measurement result of a positioning reference signal (PRS) measured by the terminal device, capability information of the terminal device, or information used by the terminal device to request assistance information from the positioning device.

6. The method according to claim 1, wherein the non-connected state comprises an idle state or an inactive state.

7. A communication apparatus, comprising:
a processor configured to execute a computer program or computer instructions stored in a memory to enable the communication apparatus to perform the method according to claim 1.

8. A non-transitory computer-readable storage medium, comprising computer instructions stored thereon, wherein, when the computer instructions are run on a computer, the computer is enabled to perform the method according to claim 1.

9. A terminal device, comprising:
a transmitter configured to send a radio resource control (RRC) resume request message to an access network device; and
a receiver configured to receive an RRC release message from the access network device, wherein the RRC release message comprises a long term evolution system positioning protocol (LPP) message, and the LPP message is from a positioning device, wherein:
the RRC release message comprises a dedicated non-access stratum message (dedicatedNAS-message),
the dedicatedNAS-message comprises a first LPP PDU,
the first LPP PDU comprises the LPP message,
the dedicatedNAS-message of the RRC release message comprises a routing identifier,
the routing identifier is usable by a core network device to identify the positioning device,
the positioning device is a location management function LMF device,
the LMF device is configured to perform positioning calculation and management on a location of the terminal device,
the LPP message comprises information indicating the terminal device in a non-connected state to report positioning information of the terminal device to the positioning device, and
the transmitter is configured to, in the non-connected state of the terminal device, send a bearer message to the positioning device through the core network device, wherein the bearer message comprises the LPP message and the routing identifier.

10. The terminal device according to claim 9, wherein the LPP message is selected from the group consisting of: a request location information message, a request capability message, and a provide assistance data message.

11. The terminal device according to claim 9, wherein the positioning information comprises at least one of: a measurement result of a positioning reference signal (PRS) measured by the terminal device, capability information of the terminal device, or information used by the terminal device to request assistance information from the positioning device.

12. The terminal device according to claim 9, wherein the transmitter is further configured to send a random access preamble to the access network device before sending the RRC resume request message.

13. A communication apparatus, wherein the communication apparatus comprises:
a receiver configured to receive a radio resource control (RRC) resume request message from a terminal device; and
a transmitter configured to send an RRC release message to the terminal device, wherein the RRC release message comprises a long term evolution system positioning protocol (LPP) message, and the LPP message is from a positioning device, wherein:
the RRC release message comprises a dedicated non-access stratum message (dedicatedNAS-message),
the dedicatedNAS-message comprises a first LPP PDU,
the first LPP PDU comprises the LPP message,
the dedicatedNAS-message of the RRC release message comprises a routing identifier,
the routing identifier is usable by a core network device to identify the positioning device,
the positioning device is a location management function LMF device,
the LMF device is configured to perform positioning calculation and management on a location of the terminal device,
the LPP message comprises information indicating the terminal device in a non-connected state to report positioning information of the terminal device to the positioning device.

14. The communication apparatus according to claim 13, wherein the receiver is further configured to:
receive, from the core network device, a first non-access stratum protocol data unit (NAS PDU) and information indicating that the first NAS PDU carries a second LPP PDU, wherein the first NAS PDU comprises the second LPP PDU, and the second LPP PDU comprises the LPP message.

15. The communication apparatus according to claim 13, wherein the LPP message is selected from the group consisting of: a request location information message, a request capability message, and a provide assistance data message.

16. The communication apparatus according to claim 13, wherein the transmitter is further configured to send a retrieve UE context request message to a source access network device, and the receiver is further configured to receive a retrieve UE context response message from the source access network device, wherein the retrieve UE context response message comprises the LPP message.

17. The communication apparatus according to claim 16, wherein the retrieve UE context response message comprises a second NAS PDU, the second NAS PDU comprises a third LPP PDU, and the third LPP PDU comprises the LPP message.

18. A communication system, comprising:
the communication apparatus according to claim 13; and
the terminal device, wherein the terminal device comprises:
a local transmitter configured to send the radio resource control RRC resume request message to the communication apparatus; and
a local receiver configured to receive the RRC release message from the communication apparatus.

19. The communication system according to claim 18, wherein the local transmitter of the terminal device is further configured to send, while the terminal device is in the non-connected state, a bearer message to the positioning device through the core network device, wherein the bearer message comprises the LPP message and the routing identifier.

20. The communication system according to claim 18, wherein the positioning information comprises a measurement result of a positioning reference signal (PRS) measured by the terminal device, and the terminal device is configured to continue measuring the PRS while in the non-connected state.

* * * * *